US007834754B2

(12) United States Patent
Kulesz et al.

(10) Patent No.: US 7,834,754 B2
(45) Date of Patent: Nov. 16, 2010

(54) METHOD AND SYSTEM FOR MONITORING ENVIRONMENTAL CONDITIONS

(75) Inventors: James J. Kulesz, Oak Ridge, TN (US); Ronald W. Lee, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 1177 days.

(21) Appl. No.: 11/204,748

(22) Filed: Aug. 16, 2005

(65) Prior Publication Data

US 2006/0187017 A1 Aug. 24, 2006

Related U.S. Application Data

(63) Continuation-in-part of application No. 10/370,913, filed on Feb. 21, 2003, now Pat. No. 6,930,596, which is a continuation-in-part of application No. 10/199,733, filed on Jul. 19, 2002, now abandoned.

(51) Int. Cl.
*G08B 29/00* (2006.01)
(52) U.S. Cl. .................. 340/506; 340/517; 340/521; 340/522; 340/3.1; 340/825.36
(58) Field of Classification Search ................. 340/506, 340/517, 521, 522, 524, 525, 3.1, 825.36, 340/825.49
See application file for complete search history.

(56) References Cited

U.S. PATENT DOCUMENTS

| 4,155,042 A | 5/1979 | Permut et al. |
| 4,270,041 A | 5/1981 | Pleyber |
| 4,322,842 A | 3/1982 | Martinez |
| 4,633,515 A | 12/1986 | Uber et al. |
| 4,649,524 A | 3/1987 | Vance |
| 4,841,287 A | 6/1989 | Flig et al. |
| 4,888,706 A | 12/1989 | Rush et al. |
| 4,956,875 A | 9/1990 | Bernard et al. |
| 5,140,419 A | 8/1992 | Galumbeck et al. |

(Continued)

FOREIGN PATENT DOCUMENTS

WO  01/26068  4/2001

OTHER PUBLICATIONS

A Frequency-Dependent FDTD Method for Inducing-Current Calculations for a Heterogeneous Model of the Human Body, by O. P. Gandhi, J. Y. Chen, C. M. Furse at the Department of Electrical Engineering, University of Utah, Salt Lake City, Utah 84112, Dated 1992, from IEEE MTT-S Digest.

(Continued)

*Primary Examiner*—Daryl Pope
(74) *Attorney, Agent, or Firm*—MacMillan, Sobanski & Todd, LLC

(57) ABSTRACT

A system for detecting the occurrence of anomalies includes a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network. At least one software agent is capable of changing the operation of at least one of the controllers in response to the detection of an anomaly by a sensor.

41 Claims, 8 Drawing Sheets

U.S. PATENT DOCUMENTS

| | | | |
|---|---|---|---|
| 5,160,853 | A | 11/1992 | Simon et al. |
| 5,214,757 | A | 5/1993 | Mauney et al. |
| 5,379,215 | A | 1/1995 | Kruhoeffer et al. |
| 5,400,246 | A * | 3/1995 | Wilson et al. ............ 700/17 |
| 5,401,413 | A | 3/1995 | Gatt et al. |
| 5,408,182 | A | 4/1995 | Stolarczyk et al. |
| 5,490,062 | A | 2/1996 | Leach et al. |
| 5,591,115 | A | 1/1997 | Raimondi et al. |
| 5,689,233 | A | 11/1997 | Kurisu et al. |
| 5,715,177 | A | 2/1998 | Machida et al. |
| 5,724,255 | A | 3/1998 | Smith et al. |
| 5,815,417 | A | 9/1998 | Orr et al. |
| 5,831,526 | A | 11/1998 | Hansler et al. |
| 5,838,237 | A | 11/1998 | Revell et al. |
| 5,910,763 | A | 6/1999 | Flanagan |
| 5,955,946 | A * | 9/1999 | Beheshti et al. ............ 340/506 |
| 5,959,529 | A | 9/1999 | Kail, IV |
| 6,023,223 | A | 2/2000 | Baxter, Jr. |
| 6,031,455 | A | 2/2000 | Grube et al. |
| 6,084,510 | A | 7/2000 | Lemelson et al. |
| 6,169,476 | B1 | 1/2001 | Flanagan |
| 6,204,768 | B1 * | 3/2001 | Kosugi et al. ............ 340/577 |
| 6,225,901 | B1 | 5/2001 | Kail, IV |
| 6,280,507 | B1 | 8/2001 | Walker |
| 6,320,501 | B1 * | 11/2001 | Tice et al. ............ 340/517 |
| 6,326,880 | B1 * | 12/2001 | Tice ............ 340/286.05 |
| 6,434,626 | B1 * | 8/2002 | Prakash et al. ............ 709/238 |
| 6,484,184 | B1 | 11/2002 | Mizushina et al. |
| 6,485,683 | B1 | 11/2002 | Walles |
| 6,517,594 | B2 | 2/2003 | Olander et al. |
| 6,624,750 | B1 | 9/2003 | Marman et al. |
| 6,686,838 | B1 * | 2/2004 | Rezvani et al. ............ 340/506 |
| 6,724,756 | B2 * | 4/2004 | Fourie et al. ............ 370/360 |
| 6,898,529 | B2 | 5/2005 | Gao et al. |
| 6,930,596 | B2 * | 8/2005 | Kulesz et al. ............ 340/506 |
| 7,020,701 | B1 * | 3/2006 | Gelvin et al. ............ 709/224 |
| 7,049,952 | B2 | 5/2006 | Kulesz et al. |
| 7,116,643 | B2 * | 10/2006 | Huang et al. ............ 370/255 |
| 2002/0044533 | A1 | 4/2002 | Bahl et al. |
| 2002/0084900 | A1 | 7/2002 | Peterson et al. |
| 2002/0143469 | A1 | 10/2002 | Alexander et al. |
| 2002/0169557 | A1 | 11/2002 | Gilbert et al. |
| 2003/0136920 | A1 | 7/2003 | Flores et al. |
| 2004/0012491 | A1 | 1/2004 | Kulesz et al. |
| 2004/0015336 | A1 | 1/2004 | Kulesz et al. |
| 2004/0117157 | A1 * | 6/2004 | Bantz et al. ............ 702/188 |
| 2005/0206506 | A1 | 9/2005 | Kulesz et al. |

OTHER PUBLICATIONS

EMCOM National Emergency Alert Notification System Copyright 1998-2002.

Andrews Bridges, NASA's Newest Search for Life Technology; Jun. 16, 2000.

Meterorlogix, MxInsight Metro Watch, Copyright 2001.

Capt. Michael Calidonna, E-Smart Treat Agents Network, Threat Agent Sensor Integration, Management, Analysis and Reporting, USAF Research Laboratory, Tyndall AFB, Florida, (AFRL/MLG), Sep. 2001.

Graviton Inc. and Exelon Infrastructure Services Announce Agreement to Jointly Market Services to Electric Utilities, La Jolla, CA Jan. 29, 2002.

Anna Bernasek, The Friction Economy, FORTUNE, Feb. 18, 2002.

Sensor Business Digest, Sensor Industry Developments and Trends, Jul. 2002.

Jack Agent Language Overview, www.agent-software.com/shared/demosNdocs/JACK_Manual_WEB/overview.html, Retreived Feb. 28, 2005.

Java Technology and Smart Dust: Building Intelligent Sensor Networks, Session TS-8601, Ritter, Simon and Caicedo, Angela, retrieved Jul. 10, 2005.

* cited by examiner

METHOD AND SYSTEM FOR MONITORING ENVIRONMENTAL CONDITIONS

RELATED APPLICATIONS

This application is a Continuation-In-Part application of U.S. patent application Ser. No. 10/370,913, filed Feb. 21, 2003, issued Aug. 16, 2005, as U.S. Pat. No. 6,930,596 and entitled SYSTEM FOR DETECTION OF HAZARDOUS EVENTS, which is a Continuation-In-Part application of U.S. patent application Ser. No. 10/199,733, filed Jul. 19, 2002, now abandoned, and entitled AUTOMATIC DETECTION AND ASSESSMENT OF CHEMICAL, BIOLOGICAL, RADIOLOGICAL AND NUCLEAR THREATS, both of which are incorporated in the present application in their entirety.

STATEMENT REGARDING FEDERALLY SPONSORED RESEARCH OR DEVELOPMENT

The U.S. Government has certain rights in this invention pursuant to Contract No. DE-AC05-00OR22725 between the U.S. Department of Energy and UT-Battelle, LLC.

TECHNICAL FIELD

This invention relates to a system for the detection of environmental conditions, including hazardous events. More particularly, this invention relates to a system for detecting and assessing environmental events or conditions, and determining a response to such events or conditions.

BACKGROUND OF THE INVENTION

The detection of hazardous events is a useful practice to warn the public as well as to inform safety and security forces as to the existence of the hazardous event. Hazardous events can occur naturally, such as in the case of a hurricane, tornado or earthquake, or can occur through a human event such as in an accidental chemical spill or in a terrorist attack. At the present time there are some early warning systems in place to provide the potentially affected populace and the relevant emergency forces with some advance notice of some disasters. For example, a system of Doppler radar installations in various communities can provide in some cases a timely warning of impending high winds and possible tornadoes. This system is limited to one particular type of anomaly, i.e., high winds, and is only partially effective because it relies on early warning sirens and broadcast media, both of which have limitations, for communication.

U.S. Pat. No. 6,169,476 to Flanagan discloses an early warning system for natural and human initiated disasters. Flanagan's system collects and analyzes data as the disasters occur, and when necessary, transmits early warnings to cause mitigation responses to lessen the disaster's impact on lives and property. The system uses a plurality of sensing, detecting and reporting sources, some of which are automatic and some of which are human originated. A central processing site receives this data and determines the type, magnitude, speed, direction and expected geographic area to be affected by the anomaly. A plurality of cell relays is disposed across a geographic area covered by the system. Once the central processing apparatus receives the data from the sensors and assesses the likely or potential outcome, a warning signal is transmitted to selected cell relays for re-broadcast to the intended receivers, which could include television, radio, cell phones, pagers, and various types of alarms. The system determines which cell relays will receive the warning signals based on the expected geographic area to be affected by the disaster, thereby only alerting those in the projected path of the threat.

Graviton, Inc. of La Jolla, Calif. has proposed an end-to-end wireless sensing and network system that provides a self-organizing and self-healing capability so that the system could survive and continue to function even if certain sensors were rendered dysfunctional. Graviton's sensors include a low-cost processor, and support a large array of sensor devices. One proposed use for Graviton's system includes homeland security. Multiple sensor nodes communicate bi-directionally, initially to a data hub. The system's modular approach allows applications (data collection, data mining, analysis, actuation) to be distributed throughout the network. Graviton's wireless distributed sensory network involves continually connecting and reconnecting between local points and far flung nodes.

Hansler in U.S. Pat. No. 5,831,526 discloses a network of hazard detectors where each detector communicates a locally hazardous condition to multiple neighboring detectors using radio frequency (RF) signals. Hansler's primary embodiment involves multiple smoke alarms in a building.

Improved communication systems for hazardous or environmental anomalies can be useful in the management of the safety and security of buildings, as well in the transportation industry. Also, better network communications would be useful in the area of process controls for such commercial and industrial areas as manufacturing, utilities and infrastructure monitoring.

It would be advantageous if there could be developed an improved sensor network and communication system.

SUMMARY OF THE INVENTION

The above objects as well as other objects not specifically enumerated are achieved by a system for detecting the occurrence of anomalies, the system including a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network. Each controller is programmed to query its adjacent nodes to assess the status of the adjacent nodes and the communication links.

According to this invention there is also provided system for detecting the occurrence of anomalies, the system including a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network. Each controller has memory storage, and each controller transmits data to an adjacent node, wherein the controller of the adjacent node stores the transmitted data in the memory of the adjacent node.

According to this invention there is also provided a system for detecting the occurrence of anomalies, the system including a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network. Each controller is programmed to send commands to one or more adjacent nodes upon the detection of predetermined anomalies by its associated sensors.

According to this invention there is also provided a system for detecting the occurrence of anomalies, the system including a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network. Each controller, when an anomaly is detected, is programmed to query its adjacent nodes to assess detection by the adjacent nodes, and upon corroboration of the anomaly by an adjacent node, the controller is programmed to transmit a signal indicative of the detection of the anomaly.

According to this invention there is also provided a system for detecting the occurrence of anomalies, the system including a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network. Each controller is programmed to analyze the data from its associated sensors and form a prediction of a consequence of the data from its associated sensors.

According to this invention there is also provided a system for detecting the occurrence of anomalies, the system including a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network. At least one of the associated sensors of a node is configured to sense a condition related to a security threat, and at least one of the sensors of the node is configured to sense a non-security threatening condition.

According to this invention there is also provided a system for detecting the occurrence of anomalies, the system including a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network, wherein the communication links are formed of a primary mode of communication and a secondary mode of communication. Each controller is programmed to assess the status of the communication links. Each controller is programmed to switch from the primary mode of communication to the secondary mode of communication upon detection of a failure of the primary mode of communication.

According to this invention there is also provided a system for detecting the occurrence of anomalies, including a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent-nodes, whereby the nodes form a network. Each controller is programmed to determine a point of origin of a detected anomaly.

According to this invention there is also provided a system for detecting the occurrence of anomalies, the system including a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network. Each controller is programmed to change its operation upon the occurrence of any one or more event in the group consisting of the detection of an anomaly, the destruction of a communication link to an adjacent node, a loss of power from a primary source of power, a loss of controller capability, a decrease in capability of a processor, a decrease in the capability of memory storage, and a command from another node.

According to this invention there is also provided a system for detecting the occurrence of anomalies, the system including a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network. Each controller is programmed to deploy sensors, or nodes, or both sensors and nodes from the node in response to the detection of an anomaly.

According to this invention there is also provided a control system for monitoring process conditions, the system including a plurality of spaced apart nodes, with each node having adjacent nodes, each of the nodes having one or more sensors associated with the node and capable of assessing process conditions, and each of the nodes having a controller connected to the sensors associated with the node. The system also includes communication links between adjacent nodes. The nodes form a network. Each controller is programmed to query its adjacent nodes to assess the status of the adjacent nodes and the communication links.

According to this invention there is also provided a system for detecting the occurrence of anomalies including a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network. The system further includes at least one software agent is programmed to determine a response to the detection of predetermined anomalies by one or more of the sensors.

According to this invention there is also provided a system for monitoring environmental conditions for anomalies including a plurality of spaced apart nodes, with each node having adjacent nodes, each of the nodes having one or more sensors associated with the node and capable of detecting anomalies, each of the nodes having a controller connected to the sensors associated with the node, and each of the controllers having a software agent. The system also includes communication links between adjacent nodes, whereby the nodes form a network. Each software agent is programmed to change the operation of at least one of the controllers and the sensors of the network when there is an indication that an anomaly has been detected.

According to this invention there is also provided a system for responding to environmental anomalies including a plurality of spaced apart nodes, with each node having adjacent nodes, each of the nodes having one or more sensors associated with the node and capable of detecting at least one environmental condition, each of the nodes having a controller connected to the sensors associated with the node. The system also includes communication links between adjacent nodes, whereby the nodes form a network. The system further includes at least one software agent capable of determining an anomaly scenario in response to the detection of at least one of the sensors and transmitting data related to the anomaly scenario to a human interface.

According to this invention there is also provided a method of monitoring environmental conditions for anomalies including distributing a plurality of spaced apart nodes, with each node having adjacent nodes, each of the nodes having one or more sensors associated with the node and capable of detecting anomalies, each of the nodes having a controller connected to the sensors associated with the node, and each of the controllers having a software agent. The method also includes communicably connecting adjacent nodes, whereby the nodes form a network. The method further includes programming the software agents to change the operation of at least one of the controllers and the sensors of the network when there is an indication that an anomaly has been detected.

According to this invention there is also provided a system for responding to environmental conditions including a node having one or more sensors associated with the node capable of detecting at least one environmental condition, the node having a controller connected to the sensors. The system also includes at least one software agent capable of determining a calculated response to the detections of the one or more sensors.

According to this invention there is also provided a system for monitoring environmental conditions including a plurality of spaced apart nodes, with each node having adjacent nodes, each of the nodes having one or more sensors associated with the node and capable of detecting at least one environmental condition. The system also includes communication links between adjacent nodes, whereby the nodes form a network. The system further includes at least one software agent associated with each of the sensors. Each of the at least one software agents is capable of determining the optimal operation, of the respective sensor based on a detection of an environmental condition of the respective sensor.

According to this invention there is also provided a system for monitoring environmental conditions including a plurality of spaced apart nodes, with each node having adjacent nodes, each of the nodes having one or more sensors associated with the node and capable of detecting at least one environmental condition. The system also includes communication links between adjacent nodes, whereby the nodes form a network. The system further includes at least one software agent disposed within the system. At least one of the at least one software agents is capable of changing the concept of operations of at least a portion of the at least one software agents based on a detection of an environmental condition of the respective sensor.

Various objects and advantages of this invention will become apparent to those skilled in the art from the following detailed description of the preferred embodiment, when read in light of the accompanying drawings.

DETAILED DESCRIPTION OF THE INVENTION

Figure 1:
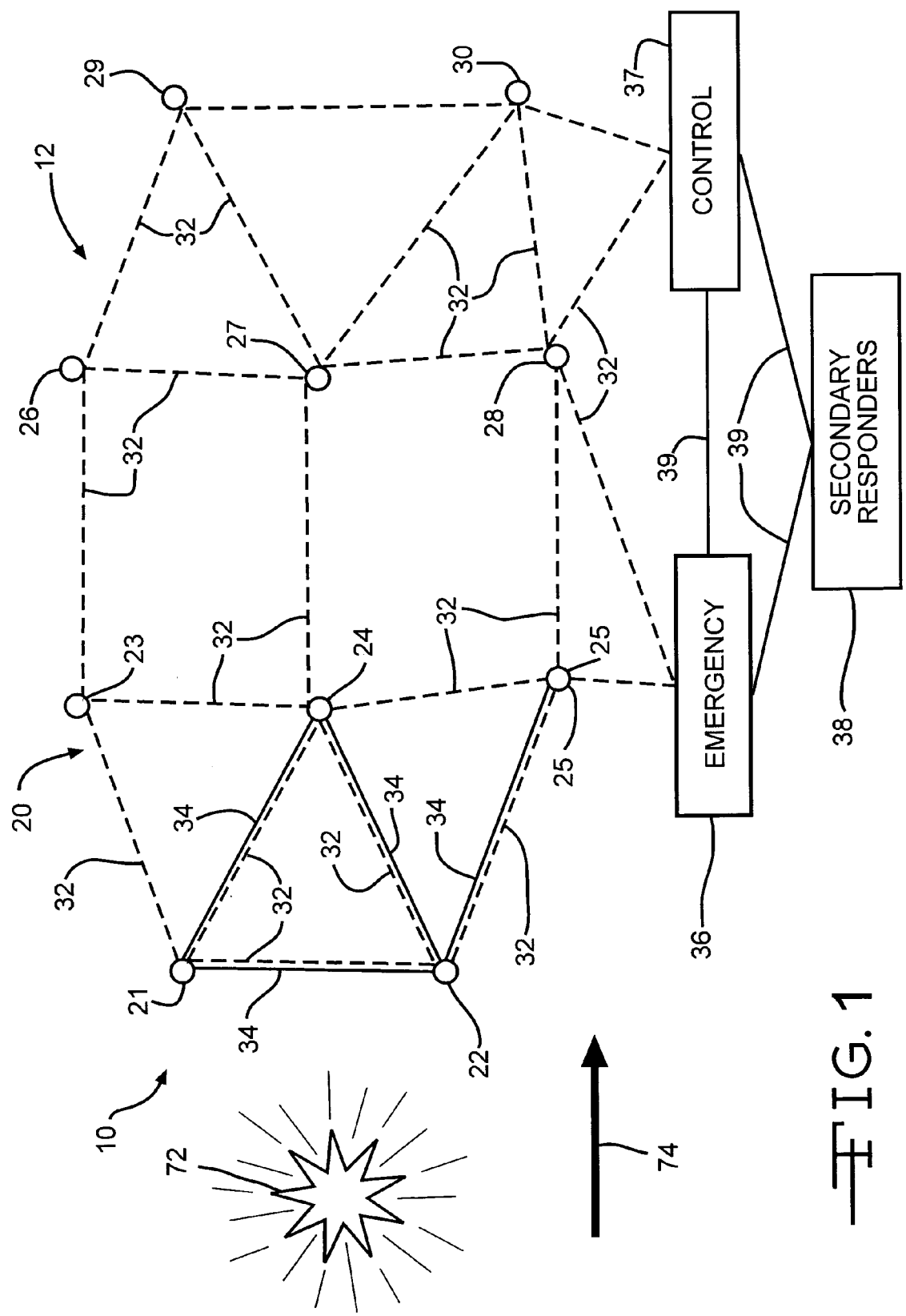
FIG. 1 is a schematic plan view of a plurality of sensor nodes forming a network according to the system of the invention.

FIG. 1 illustrates a system for detecting the occurrence of anomalies according to the invention. The system, indicated generally at 10, includes a network 12 consisting of a plurality of spaced apart nodes, indicated generally at 20, and more specifically at 21-30. Each node 20 has adjacent nodes, with adjacent nodes 20 being connected by links 32. The term "adjacent node" means any node 20 within the network 12. Preferably, adjacent nodes are the next nearest nodes in the network. As will be explained in greater detail below, each of the nodes 20 has one or more sensors associated with the node and capable of detecting anomalies. The links 32 are wireless links, such as radio frequency (RF) signals transmitted and received between adjacent nodes 20, that tie the nodes 20 together to form the network 12. While wireless links 32 are illustrated in FIG. 1, other communication modes between nodes 20 can be used in conjunction with the invention. For example, hard wire connections and satellite relays can be used. Hardwire links 34 are indicated among nodes 21-25 in FIG. 1. Internet connections can also be used.

The nodes 20 forming the network 12 can be positioned in spaced apart locations throughout the geographic area to be protected by the system of the invention. In order to protect the largest number of people, a network will be placed is within large population centers, such as within metropolitan areas. The nodes can be physically located at any location, but are preferably positioned in an elevated location, such as on top of tall buildings, on tall bridges, on hillsides, or, most preferably, on existing communication towers, such as radio towers or cellular telephone towers. It is to be understood that for various reasons, such as, for example, for the detection of anomalies other than airborne hazards, nodes can be placed at ground level, within buildings and other human-made structures, and at other non-elevated locations. Optionally, the nodes can be positioned at different vertical elevations, or have their sensors positioned at different heights to provide a vertical assessment of hazardous conditions. This can be accomplished in several ways, including using towers and balloons.

In a preferred embodiment of the invention, the network 12 of linked nodes 20 is connected to an emergency response system, indicated schematically at 36. The emergency response system 36 acts in response to notification from any of the sensors 20 that threshold detection of a hazardous substance has been detected. The emergency response system can include any of the conventional first responders for emergencies, such as police, firefighters, rescue squads and first aid teams. The emergency response system could also include, as appropriate, other responders, such as military responders, experts in chemical, biological, nuclear, and radiological hazardous materials, and antiterrorist personnel, as well as additional responders germane to the situation involved. Other types of primary responders will be apparent to those skilled in the art.

A control and command center, indicated schematically at 37 is also connected to the network 12 to enable emergency authorities to control the efforts of various responders, and to handle such issues as media interface.

Depending on the circumstances, there may be a need for secondary responders, indicated schematically at 38, including such responders as evacuation personnel, decontamination teams, clean-up crews. Other types of secondary responders will be apparent to those skilled in the art.

The emergency response system 36, the control and command center 37, and the secondary response system 38 can be linked together by any suitable means, such as communication links 39. The communications among the nodes 20 for some or all of the signals sent by the nodes can optionally be encrypted for additional security. Also, the communications to and from the control and command center can be divided in any suitable manner, such as by segregating military communications from civilian communications. In this respect, the system of the invention allows distributed access with multi-level security, and is scalable across federal, state and local governments.

Figure 2:
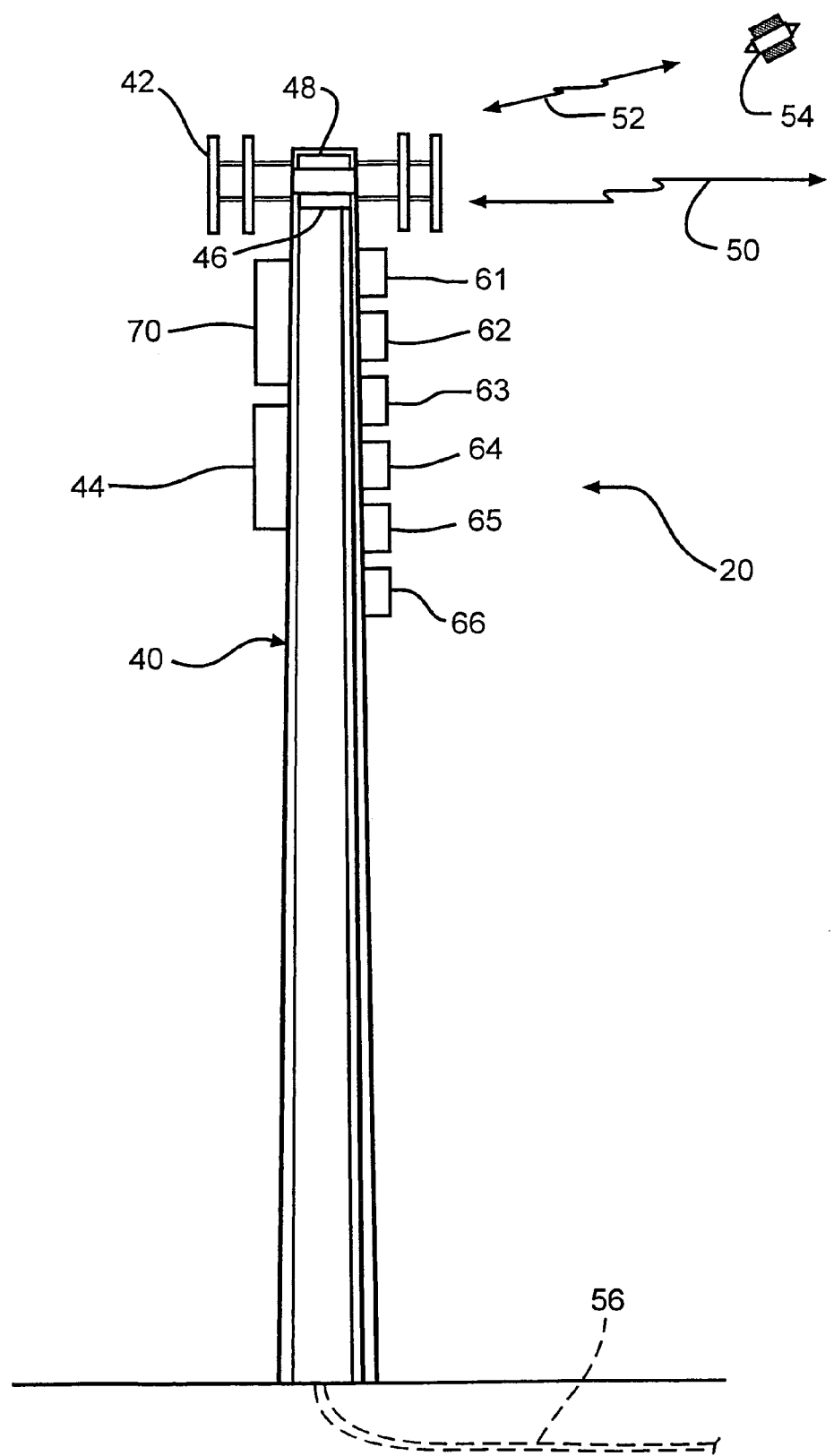
FIG. 2 is a schematic elevational view of a cell tower that supports a node of the invention.

An example of a preferred node 20 is shown in FIG. 2, where a cell tower 40 includes an antenna 42. The cell tower 40 is supplied with electric power by a means, not shown, and preferably includes an auxiliary power source 44 for use when the primary supply is cut off. The cell tower 40 includes a transmitter 46 and a receiver 48 for transmitting information to other nodes 20 within the network 12. The communication to adjacent nodes can be by any means, such as by radio waves 50 to an adjacent cell tower, not shown, or by radio waves 52 to a satellite 54 and then to a different node, or by a hardwire connection 56 to an adjacent tower, not shown. Optical communication modes can also be used.

The tower 40 includes at least one and preferably a plurality of sensors, indicated generally at 60. The sensors illustrated include a sensor 61 for sensing chemical hazards, a sensor 62 for sensing biological hazards, a sensor 63 for sensing nuclear hazards, a sensor 64 for sensing radiological hazards, and a sensor 65 for sensing explosive hazards. Sensors for detecting the presence of other substances can be used. The media sampled by the sensors can be gaseous (e.g. air), liquid or solid. Some of the sensors can be combined into one apparatus, such as a combination chemical/biological mass spectrometer (CBMS). There are many different types of sensors that can be used for the sensors 60, as would be well known to those skilled in the art. One of the advantages of the system of the invention is that different sensors can be plugged in to the system 10, i.e., installed at a node 20, and incorporated into the control scheme of the system 10. In order to ensure compatibility, it is preferred that all the sensors 60 meet an industry standard bus structure, such as RS-232 or, preferably, standard 1451 of the Institute of Electrical and Electronic Engineers. This is standard defines plug and play smart sensors that utilize a Transducer Electronic Data Sheet that electronically describes the sensor being connected to the system. This standard allows each sensor to appear to be controlled as a software object by any computer on the network. This standards based sensor interface allows the incorporation of instruments of a variety of manufacturers. This also allows easy upgrading of existing sensors and instruments, and provides the ability to connect existing sensors to the system while allowing seamless integration of new sensors as they become available and certified for inclusion into the network. The network of the invention also allows for differentiated services for priority transfer of information.

The nodes 20 contain controllers 70 that are preferably programmed to prioritize tasks so that important and time critical information will have a higher priority on network transfers than routine information transmittal. This assures that the most important information is instantly incorporated into the common network-based operational picture. Further, the system of the invention allows information with different sensitivities to be simultaneously stored and processed in an information system with users having different security clearances, authorizations, and needs to know, while preventing users from accessing information for which they are not cleared, do not have authorization, or do not have a need to know.

The sensors are preferably independent of each other so that they can be replaced for repair or upgrading. An example of a sensor 61 for sensing chemical hazards is an ion mobility mass spectrometer. An example of a sensor 62 for sensing biological hazards is direct sampling ion trap mass spectrometer. An example of a sensor 63 for sensing nuclear hazards is an alpha/beta/gamma detector. Examples of sensors 64 for sensing radiological hazards include a proportional counter, a Geiger-Muller Counter and a Reiter-Stokes ionization chamber. An example of a sensor 65 for sensing explosive hazards is an ion mobility spectrometer or a direct sampling ion trap mass spectrometer. Preferably, the sensors are completely automated and have the capability to provide quantitative measurements as well as qualitative measurements. The sensors 61-65 can be provided with their own programmable controllers, not shown, and can be configured so that threshold limits can be set in detecting certain anomalies. For example, the threshold limit on the radiological sensor 64 for radioactive particles may be set at a level of 1 count per second, whereas the threshold limit on the biological sensor 61 for anthrax spores may be set at 0.00 parts per million (ppm). The term "anomaly", as used with respect to the present invention, refers to the detection of or existence of a substance or an event or condition in excess of a threshold limit by a sensor. The threshold limit can be zero for a particular substance, such as anthrax, so that detection of any amount of the substance will be an anomaly. The threshold limit may be a maximum or minimum allowable limit for a measured substance or condition, such as a maximum wind-speed or a minimum oxygen percentage of sampled air.

In addition to the sensors 61-65 for detecting anomalies of various types, the tower can also be provided with a meteorological sensor 66 for sensing such meteorological factors such as wind speed and direction, precipitation rate, and air temperature. Additional sensors, such as video cameras, earthquake detectors and Doppler radar, not shown, can also be used. One other optional sensor is a setting/environment sensor 67 used to gather data on any external factor needed for use of the system, such as a non-security threatening condition. For example, where the system of the invention is applied to provide a safe truck route for hazardous cargoes, the setting/environment sensor 67 can be configured to sense or detect traffic flow data, such as the speed or volume of traffic moving past one of the nodes 20 in the network 12, an expected delay in entering a crowded tunnel in a congested metropolitan area, an overloaded highway bridge, or a flooded river. Another example of a non-security threatening condition would be the level of ozone detected at the node 20. Also, the system and network of the invention can be used for tracking of ID-coded cargo containers, rail cars, trucks, planes, and ships. Further, the system of the invention can be used to control and monitor the movement of cargoes of hazardous material, as well as to oversee the safety and security of the route of transport of the cargo of hazardous material.

Figure 3:
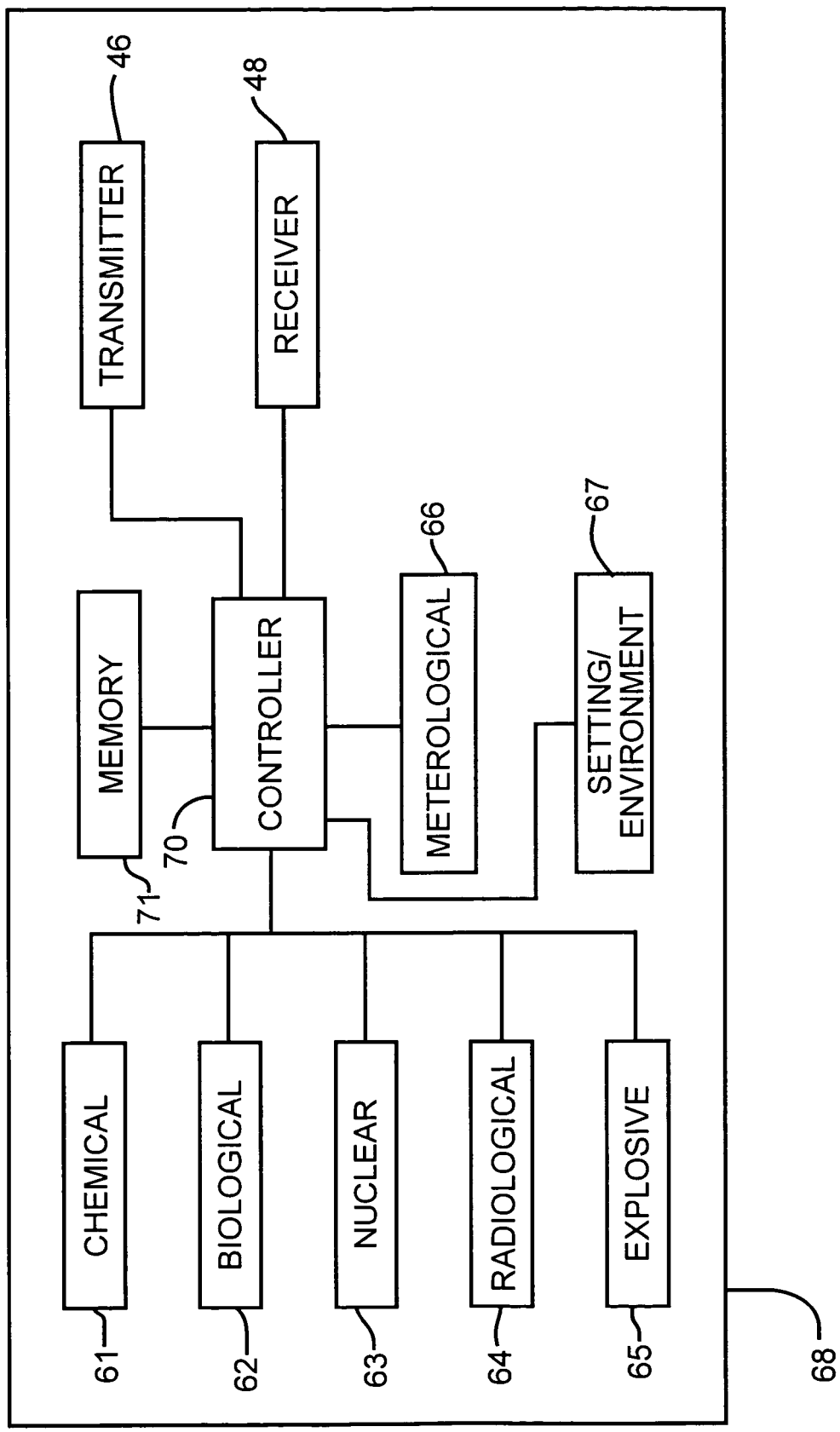
FIG. 3 is a schematic view of a control diagram for the node of the type illustrated in FIG. 2.

As shown in FIGS. 2 and 3, each of the nodes 20 has a control scheme 68 that includes a controller 70 connected to the sensors 60 associated with the node, and to the transmitter 46 and receiver 48. The controller 70 can be any type of information processor, such as a computer, suitable for processing the information received from the sensors, and from external sources via the receiver 48, based on stored information kept in a memory device 71 associated with the controller 70. The controller 70 includes operating software, preferably containing algorithms for computing responses to various scenarios and inputs.

Referring to FIG. 1, the system 10 of the invention is adapted to detect the presence of hazardous material resulting from an anomalous event, such as the detonation of a dirty bomb 72, with a wind direction indicated by the arrow 74. Although the dirty bomb 72 is shown as being outside the network 72 of the system 10, the system 10 would work in a similar manner if the dirty bomb were within the geographic area of the network 12. Eventually, the radiological sensor 64 at node 22 would sense the presence of the radiological fallout from the dirty bomb 72 at a level exceeding its predetermined threshold level. The controller 70 within node 22 would react to the detection of radiological material by sending notification to the adjacent nodes, i.e., nodes 21, 24 and 25 over the available links 34 or 32. These nodes would in turn send notification to additional nodes and eventually the notification will reach the emergency response system 36 and the control and command center 37. The controller 70 can be configured to automatically query each of its associated sensors 60 at the node 20, and to automatically broadcast a signal upon the detection of a hazardous substance exceeding a predetermined allowable level or limit. The signal from the node where the anomaly was initially detected could be a signal that includes a command to each subsequent node to pass the signal on to the emergency response system 36 and the control and command center 37.

In one embodiment of the invention, the controller 70 includes modeling software that enables the controller to predict movement and/or dispersion of hazardous material from an initial location where the hazardous material is detected to a subsequent, different location. The term "plume", as used with respect to the present invention, refers to a volume in a media, such as air, water or soil, that contains the hazardous component. The modeling software enables the controller to predict or determine a future migration path of the plume of the hazardous component, both in terms of location or distribution of the hazardous component at future times, and in terms of the quantification or concentration at various locations in the future. The controller 70 is programmed to analyze data from its associated sensors and form a prediction of a consequence of the data. More specifically, the modeling of plume movement and dispersion will take into account input from the relevant sensors 60 at the node 20 connected to the controller 70, including, to the extent pertinent, information from the meteorological sensor 66. For example, the controller would take into account wind speed and direction information from the meteorological sensor 66 when modeling the future plume of an airborne radiation hazard. This plume dispersion modeling will enable the command and control center 37 to inform or warn the populace potentially affected by the hazardous material, and will give the emergency response system 36 a more accurate view of the scope of the disaster or hazard. The integration of population demographics into the computer model will enable a prediction of the number of people potentially affected by a detected disaster. Also, integration of exposure effects on living organisms into the computer model enables decisions covering appropriate response actions. With a controller at each node 20 of the network 12, each of several controllers 70, upon the detection of the hazardous substance, can form its own determination of the future migration path of the plume, and can provide its own warning signals. Preferably, the modeling software in the various controllers 70 of the affected nodes 20 will be configured to reconcile differences associated with multiple computer-generated plume determinations.

It is advantageous to provide plume modeling from the controllers 70 in more than one node 20 because each controller could have different input values (e.g. detected concentration of the hazardous material, wind speed, wind direction, precipitation). For example, with reference to FIG. 1, if both node 21 and node 22 detect a hazardous substance, and if the controllers 70 of both nodes 21 and 22 develop a plume model, then the aggregate plume model or combination of the two plume models may provide a more accurate picture of the expected movement of the hazardous plume over time. Also, detections at multiple locations can be combined into a single collaboratively developed plume model. The plume model, or models, can be periodically or continuously upgraded as additional information (from any source) becomes available in order to increase the accuracy of the calculations. The controllers 70 can also be programmed to update the modeling by iterative sensing and analysis. The modeling software can be a customized program, and can be a version of software used for the U.S. military hazard prediction and assessment capability (HPAC). This is a government-owned software system that is publicly available with approval from the holding agency. Other plume dispersion models can be used.

In a specific embodiment of the invention, the controller 70 is programmed to determine the point of origin or initial source of the hazardous material, i.e., to pinpoint the location of the hazardous material source, such as a bomb or other release. For example, with reference to FIG. 1, the detection of a hazardous substance by the sensors 60 of node 22, along with wind speed and direction information from the meteorological sensor 66, may be sufficient to calculate the location of the bomb 72. This will be advantageous because it will allow a better prediction of the consequences of the bomb, i.e., fallout. Further, it will assist law enforcement and investigative agencies in assessing the nature of the disaster, and in apprehending suspects. Also, if the disaster is something in the nature of a spill or leak of hazardous material, pinpointing the source may enable a swifter cutting off of the flow or containment of the hazardous material, such as, for example, where a railcar has derailed in a remote location and has spilled hazardous material which enters the airstream or a water course.

In a preferred embodiment of the invention, the controller 70 of each of the nodes 20 in the network 12 is programmed to periodically query the controller 70 in the next nearest node or nodes 20. This query could merely consist of an inquiry as to the readiness of the next nearest node to accept signals from the first node. For example, with reference to FIG. 1, the controller 21 could periodically query the controller of node 22 to verify that node 22 is ready to accept signals and can be used as part of a path from node 21 to the emergency response system 36 and the command and control center 37. The query could also be a request for the second node 22 to confirm that all its sensors 60, its transmitter 46 and receiver 48, and its power supply are in readiness for action. The query from one node 60 to the next can be programmed to occur infrequently, such as once per hour, or very frequently, such as once each second, or any other suitable time period. The controller 70 of node 21 can be programmed to query the next nearest nodes 22, 23 and 24 at an infrequent interval, such as, for example, every 15 minutes as long as there is no detection of a hazardous substance by any of its sensors 60 and as long as there is no notification from an adjacent node 22, 23 and 24, that a hazardous substance has been detected. On the other hand the controller can be programmed to send status queries with short intervals when there is an indication from any source that an anomaly has been detected or sensed. In this respect the controller is programmed to change the intervals of status inquiries, i.e., shorten or lengthen the intervals.

The sensors 60 can be programmed or configured to periodically or continually provide a readiness signal to the controller 70. In order to conserve power, the sensors 60 may also be configured to take samples only periodically rather than continuously. In some cases the sensors 60 may be configured for the sensing of multiple substances or may have multiple levels of testing. For example, the sensor may be configured to conduct a first level test for a particular biohazard with the first level test being merely a gross screening, a second level test for a more comprehensive analysis, and a third level test with detailed automated test steps to more particularly hone in on the substance in question. The controller 70 can be configured to require the sensor to conduct the second and third level of testing when there is a detection of an anomaly with the first level test, or when there is an indication from another node 20 that an anomaly has been detected or sensed. Further, the controller 70 can be programmed to lower the threshold or otherwise adjust the threshold for the sensors 60 associated with the node upon the detection of an anomaly. The controller 70 can also be programmed to test and recalibrate a sensor to assure its measurement accuracy.

One of the advantages of the communication between adjacent nodes 20 is that the controller 70 of one node 20 can signal an adjacent node 20 to carry out different functions. For example, if an anomaly has been detected based on a specific test by a specific sensor 60, then the controller 70 can be programmed to send a signal to its next nearest nodes 20 (or to any number of nodes) for each of the analogous sensors 60 to conduct its own test for the detected substance. The testing by the second node would be used to corroborate the findings of the first node. The controller 70 of the first node 20 could be programmed to delay sending a general signal to the emergency response system 36 and the control and command center 37 until there is corroboration from a second node. The ability of the system to view a disaster from any of several nodes is beneficial by giving the system different perspectives. Further, the controllers 70 can be configured so that each controller, when an anomaly is detected, is programmed to collaborate with the controller of an adjacent node use information from the controller of the adjacent node in assessing a response to the anomaly. The collaborating can be in the form of sharing data, retrieving information from an adjacent or next nearest controller, or collaboratively working with another controller to develop a predictive analysis. Also, the controller 70 can be programmed to assess the relevant data available to it and then make a determination as to whether to send data in an unprocessed form or to process the information before sending information.

In one embodiment of the invention, each controller is programmed to determine whether or not it has a clear, available communication link to the emergency response system 36 and the control and command center 37. This can be accomplished in several ways. The controller 70 can be programmed to query the next nearest node 20 to test the link between the two nodes. As part of that query, the controller of the first node can be programmed to inquire of the controller of the second node if the second node has a clear link to a third node, or, directly or indirectly, to the emergency response system 36 and the control and command center 37. These queries can continue until the controller 70 of the first node finally gets a signal confirming that a complete link or path to the emergency response system 36 and the control and command center 37 is available. In this sense, the nodes 20 act as relays for signals from distant nodes to a target communication destination. The controller of a second node can be programmed to receive signals from an adjacent first node and transmit the signal to a third node. Optionally, the controller of the second node can amplify or modify the signal before transmitting the signal to the third node. Since there is a link 32 or 34, as well as possibly satellite links, between adjacent nodes 20, it can be seen that there are many possible routes for signals from one node 20 to reach the emergency response system 36 and the control and command center 37. In the event that one or more of the links is destroyed or otherwise rendered inoperable, then the network system 10 is designed to secure an alternate path for each of the nodes. Therefore, upon a finding in response to a query of an adjacent node 20, that the adjacent node or the communication link to the adjacent node is inoperable, the controller 70 is programmed to transmit data over a link to a different node. Therefore, it can be seen that the system of the invention includes a high level of reliability and survivability. In a particular aspect of the invention, when there is a failure of a part, or whole, of the local network, the controller 70 can be programmed to reconfigure itself to communicate with, and become apart of, another network within its communication range.

The controller 70 can be programmed so that it has a primary or first choice adjacent node, or alternatively the controller 70 can periodically query several of or all of its adjacent nodes to assess the then-current available paths along the links to reach the emergency response system 36 and the control and command center 37, or any other desired location. Also, it is possible for direct links to be established between any given node 20 and the emergency response system 36 and the control and command center 37, thereby obviating the need for communicating via the remainder of the network 12 for that particular node. Further, although the primary mode for communication from any particular node 20 to another node may be an RF signal, in one embodiment of the invention the controller 70 of the node is programmed to switch to at least one different mode of communication, i.e., via satellite 54 or hardwire 56, upon the detection of a failure of the primary mode of communication. In this respect, the network 12 has a self-healing capability, and a redundancy of communications links is provided.

The controllers 70 can be programmed to send commands to adjacent and next nearest nodes. For example, each controller 70 can be programmed to send a command to run a specific test. The controllers 70 can be programmed to send a command to modify a threshold level for a test, or to send a command to transmit additional data. The controllers 70 can be programmed to send a command to change the frequency of a routine specific test, or to send a command to send the status of calibration of a sensor. Further, the controllers 70 can be programmed to send a command to query identification data (date of manufacture, model number, etc.) of a sensor, to send a command to change the functionality of an entire node. Also, the controllers 70 can be programmed to send a command to change the transmittal rate of data, and can be programmed to send a command to perform predictive analysis.

Further, the controllers 70 can be programmed to send a command to become a data storage facility, and can be programmed to send a command to query another node.

In one embodiment of the invention, the controllers 70 of the nodes have a significantly sized memory 71 to be able to store data from the associated sensors 60 and various other inputs. Further, each controller 70 is periodically sending signals to the adjacent or next nearest nodes 20 with some or all of this data, and the controller 70 of the receiving node is programmed to store the data in the memory 71 of its controller 70. Therefore, if a node is destroyed or otherwise rendered inoperable, such as for example by an earthquake or an explosion, the next nearest nodes 20 will have stored in their memories 71 the data from the destroyed node.

One of the advantages of the use of controller 70 in each of the nodes 20 is that the controllers can be occasionally supplied with signals to change the operation of the node, upgrade the software in the controller, or to add a new function or new commands. For example, if a new type of radiological sensor 64 is added to each of the nodes 20 in the network 12, the software for controlling the new sensors 64 and for interpreting the signals from the new sensors can be downloaded or otherwise supplied to the controllers 70 of each of the nodes. Other examples of input to the controllers 70 is providing commands to modify the threshold limits of various sensors, providing commands to calibrate the sensors 60 and other equipment, and conducting preventative repair and maintenance. Commands to the controllers 70 in the nodes can come from any appropriate source, such as the command center 37, and can be sent via any suitable link, such as a radio wave link 32, a hard wire link 34 or a satellite link. Alternatively, the upgrade or new instructions can be downloaded manually at the node. Further, the controller can be programmed to change its operation upon the occurrence of any one or more event in the group consisting of the detection of an anomaly, the destruction of a communication link to an adjacent node, a loss of power from a primary source of power, a loss of controller capability, a decrease in capability of a processor, a decrease in the capability of memory storage, and a command from another node. One example of a change in operation of a node is programming the controller so that the node adopts a new function, such as, for example, changing the type of test run by a sensor, running a self-calibration test, or changing the location of the node. Further, signals or commands to a controller to change its operation, including changing the function of the node, can be given by another node. Another advantage of the use of a controller 70 in each of the nodes is that there can be a comprehensive interpretation and analysis of the detection data from the sensors 60 prior to initiation of a communication from the node to other nodes or to the emergency response system 36 and the control and command center 37. Therefore, the signal can contain a comprehensive analysis rather than mere raw detection data. For example, instead of broadcasting merely the fact of a detection of an anomaly, such as, for example, an anthrax substance detected by the biological sensor 62, the controller can be programmed to query adjacent nodes, and provide a prediction of plume movement for the anthrax based on the responses from the adjacent nodes and the input from the meteorological sensor 66. Therefore, the communication from the nodes will be much more informative than would otherwise be the case.

The controller can be programmed to provide signals of a specific nature in response to specific anomalies. For example, the controller can be programmed to automatically send signals to an audible tornado alarm, located either at the node or in a different location, in the event that a Doppler radar sensor detects a situation indicating a tornado. Another example is that the controller can be programmed to automatically send signals to a process control apparatus, such as the controls for shutting down a nuclear reactor in the event that a serous explosion is detected by the explosive sensor 65.

In a specific embodiment of the invention, the controller 70, acting in response to information sensed by its sensors 60, or information from another source, sends a signal to a sensor deployment mechanism which acts to deploy additional sensors to new locations not originally provided with sensors. The sensors could be deployed outwardly or inwardly. The deployment mechanism could be fleet of mobile sensor trucks, not shown, that are dispatched to travel to the site of interest for further testing or other action with respect to the detected anomaly. In another example, there could be a drone, or a low level, sensor-deploying missile or rocket, not shown, that projects robot sensors to the area of interest. Deployment of the sensors could involve moving sensors up or down a cell tower. Also, the controllers can be programmed to move the entire node, or to send a signal to an adjacent node for the adjacent node to move. Referring to FIG. 1, once the node 22 detects the radioactive fallout from the bomb 72, a sensor-deploying low-level rocket could be directed to drop additional sensors on the ground in the vicinity surrounding the origin point of the bomb 72, as determined by the plume modeling software. The purpose of the additional sensors would be to provide a more detailed assessment of the anomaly. Deployed sensors could be provided with a positioning system, such as a Global Positioning System.

The network 12 of nodes 20 connected by the links, 32, 34 lends itself to a dual use of the apparatus, wherein not only does the network 12 support the system of detecting anomalies for safety and security purposes, but also supports a non-security function. For example, if a node 20 is placed near a major highway, the network 12 can be used to monitor traffic flow and report the traffic flow data to the emergency response system 36, or, alternatively, to some other interested party, such as to the media for reporting current rush hour traffic information. For this purpose one of the sensors 60 at the node 20 might be a video camera. Another possible non-security use is the use of air quality monitors. In a particular embodiment of the invention, some of the data from the sensors 60 can be directed by the controllers 70 to specific private end users. For example, an individual with an asthma condition could purchase access to ozone level or smog data from the meteorological sensor 66 at various nodes 20 in the vicinity of the individual's residence. Also, a delivery company or taxi company could purchase traffic data from nodes equipped with traffic monitoring sensors.

While the examples of networks 12 illustrated so far have been limited to nodes produced at spaced apart towers, such as cellular phone towers 40, there are many other types of networks and possible sites for nodes 20 that can be used in conjunction with the system of the invention. The system of the invention can be used to monitor lakes, rivers, reservoirs and other bodies of water to ensure their security and to provide monitoring data. Pipelines, bridges and canals can also be monitored to detect anomalies affecting the security of the structure as well as the safety of the surrounding population.

Mobile nodes can also be used to form a network that can be part of a system according to the invention. For example, the mobile nodes can be arranged on ships, railcars, busses, taxis, emergency vehicles, and vehicles for utility companies. Advantageously, the mobile nodes will include a global positioning device or similar positioning device for an exact determination of the location of the mobile node. Also, mobile nodes can be positioned temporarily in specific locations for particular purposes. For example, mobile or portable nodes can be set up temporarily in sporting venues, such as at the Olympic Games or at NASCAR events. Also, mobile nodes can be carried by people, such as by soldiers on a battlefield, or by first responders or rescue personnel at the site of a disaster.

Figure 4:
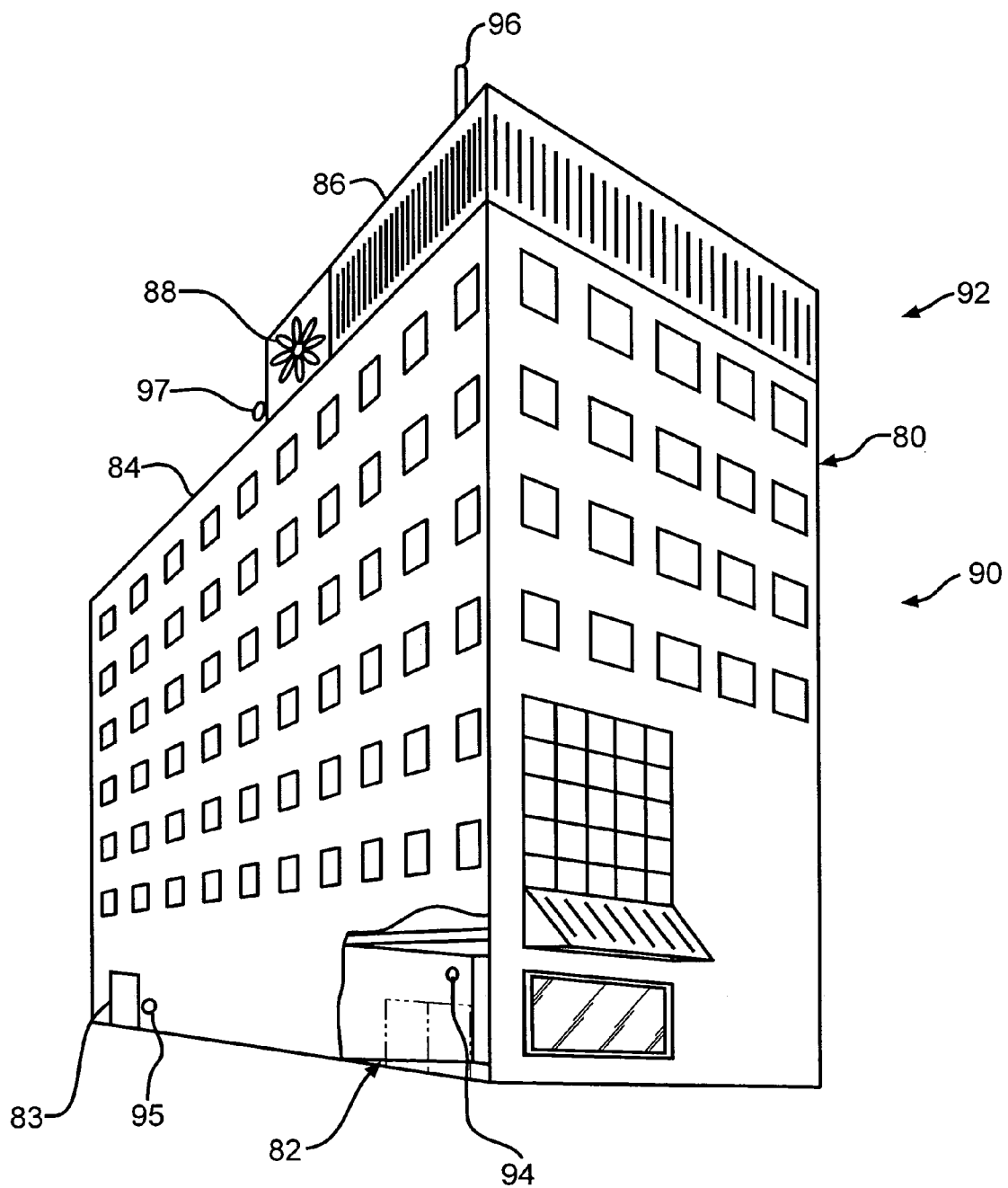
FIG. 4 is a partially cut-away schematic view in perspective of a building equipped with the system of the invention.

Individual buildings as well as complexes of buildings can be provided with networks of nodes according to the present invention. Examples include airports, rail and subway stations, shopping malls, sports stadiums, government buildings, monuments, hospitals, college campuses, power plants and industrial sites. As shown in FIG. 4, an office building 80 can include a main entrance 82, a rear entrance 83 and a roof 84. Positioned on the roof is a ventilation system 86 that includes an air intake fan 88. The system 90 of the invention includes a network 92 of nodes, including specifically (and schematically) a node 94 at the main entrance 82, a node 95 at the rear entrance 83, a node 96 on the roof 84, and a node 97 at the air intake fan 88. Additional nodes can also be used. Preferably, each of the nodes 94-97 includes multiple sensors, a transmitter and a receiver in a manner similar to that shown in FIG. 2. Another sensor for the nodes 94-97 can be fire and smoke detectors, not shown. One of the sensors on the nodes can be a video camera for optical detection of hazards by a scanner, or for visual detection by security personnel in a different location in the building 80. The communication among nodes 94-97 can be via any suitable connection, such as wireless connections or hardwire connections. The network 92 of nodes can be linked via any suitable connection to an emergency response system and a control and command center, both not shown. Also, the network of nodes can be connected to and incorporated into a building security system, not shown, for the building 80. The controllers of the nodes, such as nodes 96 or 97, can be programmed to send a signal, in the event of a detection of an airborne hazardous substance by the nodes, to the fan 88, causing the fan 88 to shut down to avoid drawing the airborne contaminants into the building's ventilation system.

EXAMPLE

An integrated hazard detection and assessment system underwent field testing at cellular communication towers in Tennessee. The field test included a Block II chemical/biological mass spectrometer (CBMS) for detection of airborne chemical agents in the mail room of the City-Center building in Knoxville, Tenn., a direct sampling ion trap mass spectrometer for detection of chemical agents in air and compounds in water in Chattanooga, Tenn., and a Block II CBMS for detection of airborne chemical and biological agents in Nashville, Tenn.

All sensors were networked over an existing conventional phone line system to a Central Command Center at the State of Tennessee Office of Homeland Security in Nashville, Tenn. Detection information and local meteorological data were input to the U.S. military hazard prediction and assessment capability (HPAC) for plume prediction. The results of the field test performed are summarized in the table below:

TABLE 1

| Detection of Airborne and Waterborne Chemicals | | |
|---|---|---|
| Agent | Detection and Identification Time (Sec) | Total Elapsed Time of Test (Sec) a |
| Air Tests | | |
| Sarin simulant (methyl salicylate) | 4–25 | 39–96 |
| Anthrax stimulant [*Bacillus globigi* (BG)] | 29–40 | 64–77 |
| Water Tests | | |
| Chloroform | 1.7–2.0 | b | a Total elapsed time from injection in the sensor to detection, identification, and hazard plume prediction at the command center.
b HPAC water plume dispersion modeling was not performed for chloroform in water.

As shown above, the time for detection and identification of the simulated airborne chemical threat (methyl salicylate), simulated airborne biological threat (*Bacillus globigi*) and waterborne chemical threat (chloroform) was less than or equal to 40 seconds. The three sensing stations all transmitted the detection and identification information to the Central Command Center for plume analysis. The total elapsed time for the detection, identification and hazardous plume prediction for the airborne chemical and biological simulated threats at the Central Command Center was less than or equal to 96 seconds.

During a separate test, the telephone connections were placed in standby mode (no open lines) and a Sarin gas simulant was sprayed into the sensors at the three locations contemporaneously. The system was then required to automatically call the Command Center and convey the sensor data. The Central Command Center successfully received sensor data without the loss of information from the simultaneous alerts at the three remotely located sensor locations. Although three sensor stations were used in the test performed, the invention may be practiced with hundreds or thousands of remotely locate sensor stations, such as across an entire country.

Figure 5:
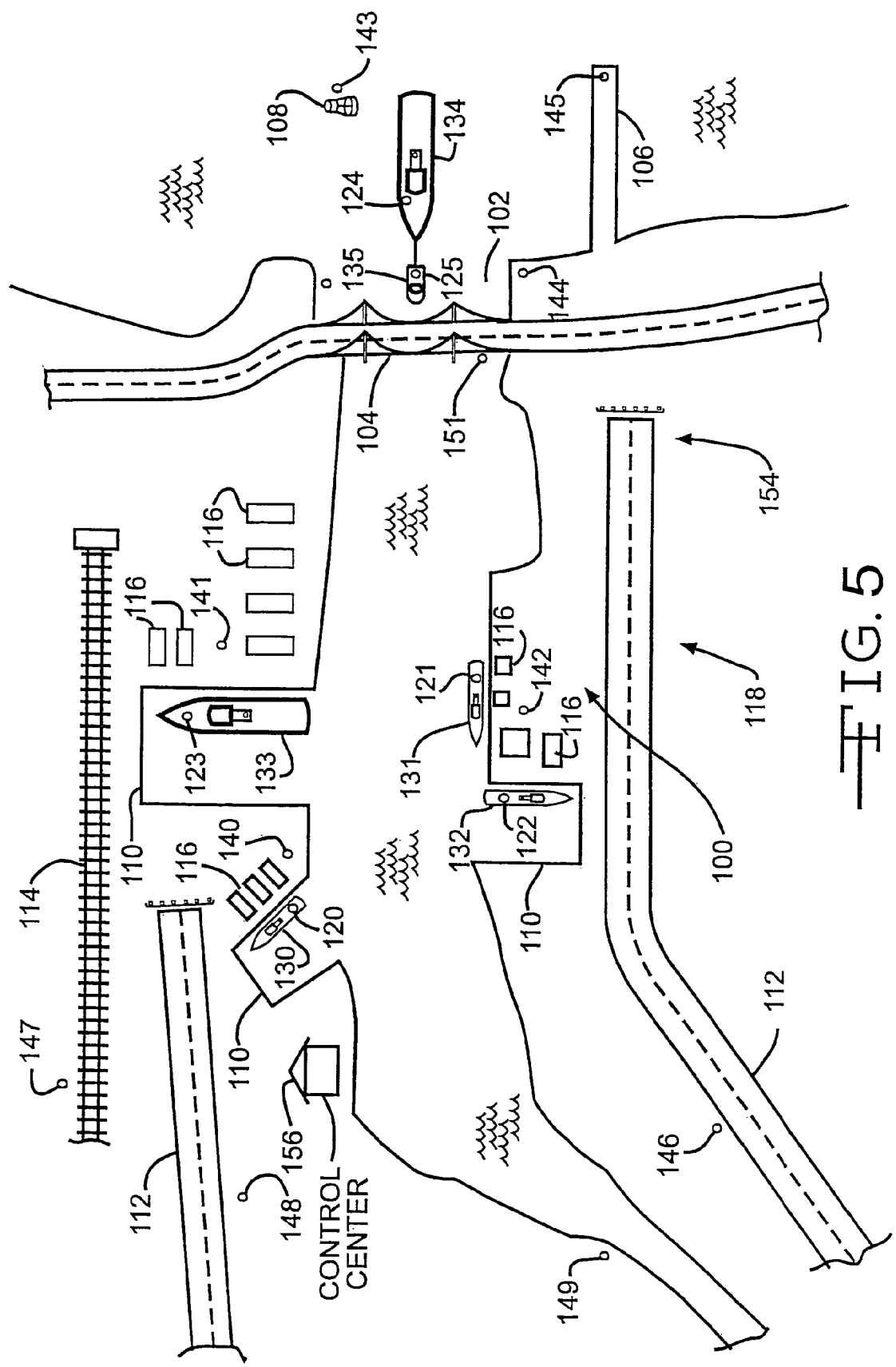
FIG. 5 schematically illustrates a shipping harbor provided with a system of detecting anomalies and monitoring the movement of shipping containers according to the invention.

FIG. 5 illustrates a shipping harbor, indicated at 100, that includes a harbor mouth 102, a bridge 104, a jetty 106 and a harbor light 108. The harbor 100 includes slips 110, access roads 112, and rail lines 114. Much of the cargo being moved onto and from the ships is in the form of shipping containers 116. A system 118 for detecting anomalies includes a plurality of nodes 120-125 that are positioned on ships 130-134 and a tugboat 135. Additional nodes 140-150 are positioned at strategic points throughout the harbor, and a node 151 is located on the bridge 104. The nodes 120-125, 130-135 and 140-151 are linked together to form a network 154, which can also be connected to a harbor control center 156, as well as to an external emergency response system and control and command center similar to the emergency response system 36 and the control and command center 37 shown in FIG. 1. The links can be hardwire links, wireless links such as RF links or satellite links, or any other suitable means of connecting the nodes.

The nodes 120-125, 130-135 and 140-151 include sensors, which can be similar to those described above with respect to FIGS. 2 and 3, for detecting various anomalies, so that the system 116 of the invention can detect anomalies in and about the harbor 100, and respond in a manner suitable for the situation, such as in a manner described in the discussion above of FIGS. 1-3. For example, if the ship 134 is moving in a manner possibly leading to a collision with the bridge 104 or the jetty 106, sensors on nodes 143, 144, 145, 151, 124 and 125 can detect this anomaly and the appropriate controllers can provide signals to the ship captain of the ship 134. In addition to having the capability for detecting anomalies, the system 118 can also provide a valuable additional security and business function by monitoring the movement of the containers 116. The system 118 of the invention can be used for real time tracking of the security and status of the shipping containers 116 entering and leaving the harbor area 100, whether by rail, road or ship. Each cargo container 116 can be provided with an identification tag, not shown, preferably having an electronic chip for identification purposes. Some or all of the nodes 120-125, 130-135 and 140-151 can include sensors, not shown, for detecting the identification tags of the cargo containers. It is to be understood that systems similar to system 100 can be established to handle other types of transportation circumstances. For example, a similar system could be used to monitor and control truck transportation at local, regional or national trucking centers or truck weigh/inspection stations according to the invention. Likewise, a similar system could be used to monitor and control rail transportation. Further, systems according to the invention can be international in scope, with nodes in ports, rail or trucking centers in other countries.

Figure 6:
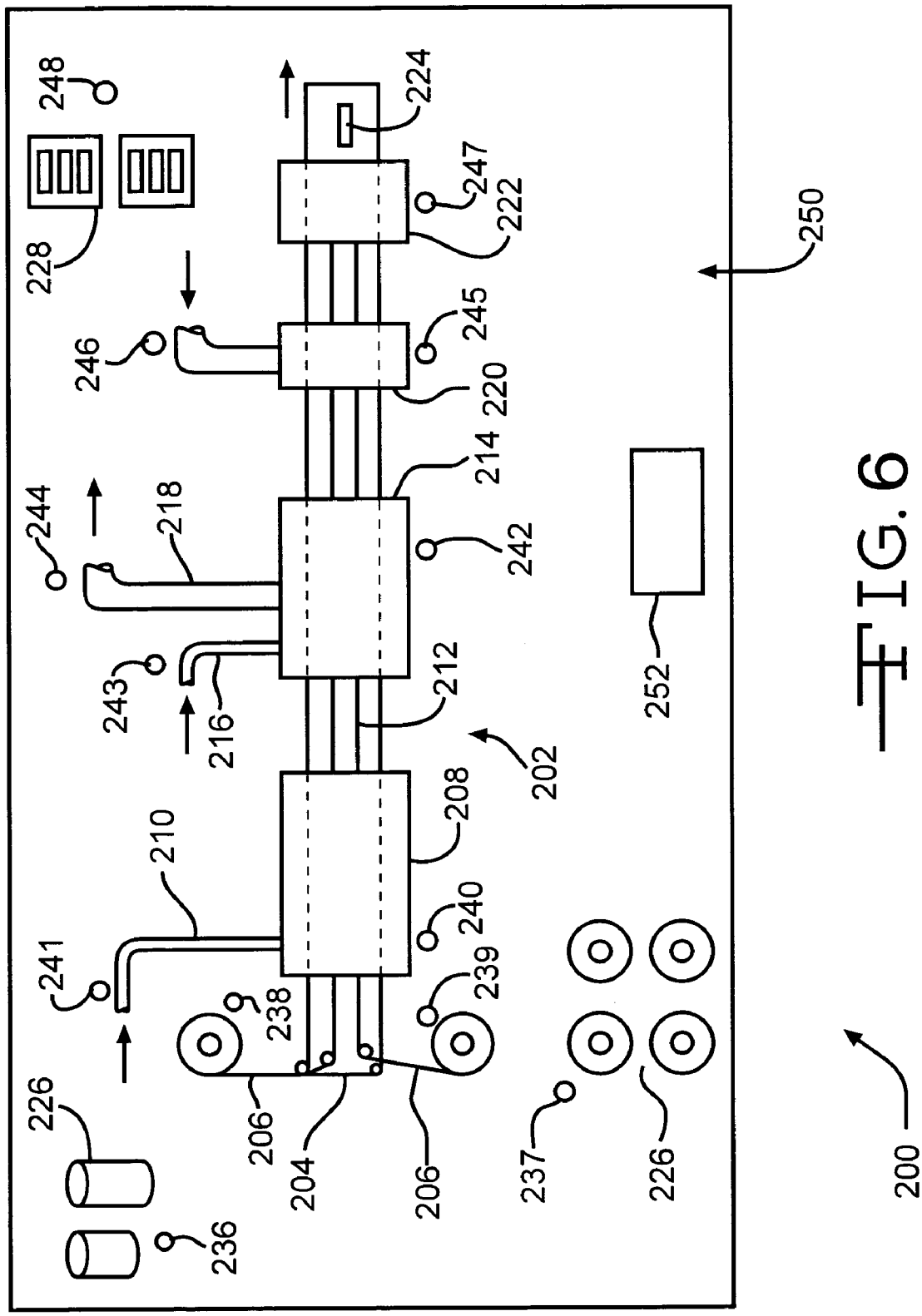
FIG. 6 is a schematic plan view of a manufacturing facility having a system of process control according to the invention.

FIG. 6 illustrates a factory 200 that includes a continuous molding process having a control system according to the invention. Although the process disclosed is a molding process, it is to be understood that the principles of process control according to the present invention can be incorporated into many different process control situations, such as, for example, a process control system for an oil field. As shown in FIG. 6, the molding process is carried out on a continuous molding machine 202 which includes a continuous conveyor 204. At the front end of the machine 202 reinforcement material 206 is continuously supplied to molding equipment 208. Liquid resin material is supplied to the molding equipment 208 via conduit 210, and a continuous molded part or blank 212 is formed. The continuous blank 212 is then conveyed to a paint booth 214, where paint is supplied by a paint supply line 216, and paint fumes are removed by exhaust duct 218. The painted continuous blank is then passed through an oven 220 for paint curing. The final station is a cutter 222 where the blank 212 is cut into individual parts 224. Raw material inventory 226 is stored at the front end of the molding machine 202, and the inventory 228 of finished parts 224 is stored at the terminal end of the molding machine 202.

The control system of the invention includes a plurality of nodes 236-248, each having one or more sensors, not shown, for detecting process conditions, or anomalies, or both process conditions and anomalies. Substantially all of the nodes 236-248 have a controller, preferably similar to the controller 70 disclosed in FIGS. 2 and 3. At node 240 the sensors are configured to monitor process conditions within the molding equipment 208. Node 241 senses information regarding the flow of resin to the molding equipment. This information could include, for example, the flow rate of the resin through the conduit 210, the temperature of the resin, and the viscosity of the resin. Node 242 senses the level of various process parameters involved with the painting process in the paint booth 214. Nodes 245 and 247 monitor the curing oven 220 and cutter apparatus 222, respectively, in a similar manner. The nodes 236-248 are connected by wireless links to form a network 250, although any suitable type of linking, such as hardwire links (including optical cable), can be used. The control system of the invention preferably includes a master controller, indicated schematically at 252, that is linked to each of the nodes, either directly, or indirectly via another node.

In view of the above description, it can be seen that the system of the invention provides a network or common data highway for data communication from a multiplicity of sensors. The system of the invention allows the real-time detection, identification and assessment of chemical, biological, radiological, nuclear, and explosive threats. The network infrastructure allows distributed access with multi-level security, information analysis, information management and a common network-based operational picture. The system is designed to assure an ultra-high level of reliability, survivability and security. The architecture is scalable across state, local, and federal governments. This system is capable of using commercial standards to provide interoperability, maintainability, controllability, and upgradeability over a wide range of sensors and communication network infrastructure.

Figure 7:
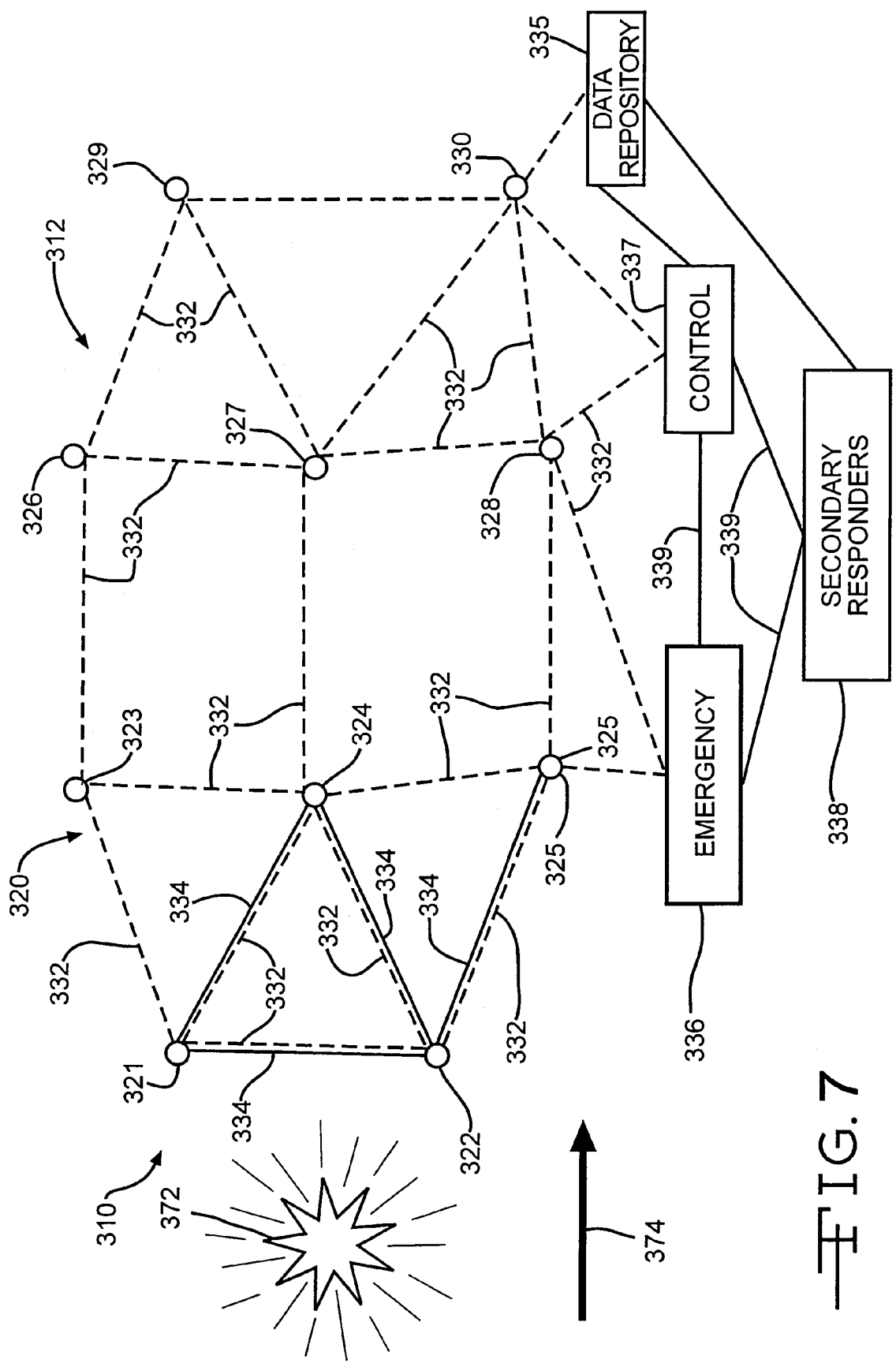
FIG. 7 is a schematic plan view of a plurality of sensor nodes forming a network according to the system of the invention.
Figure 8:
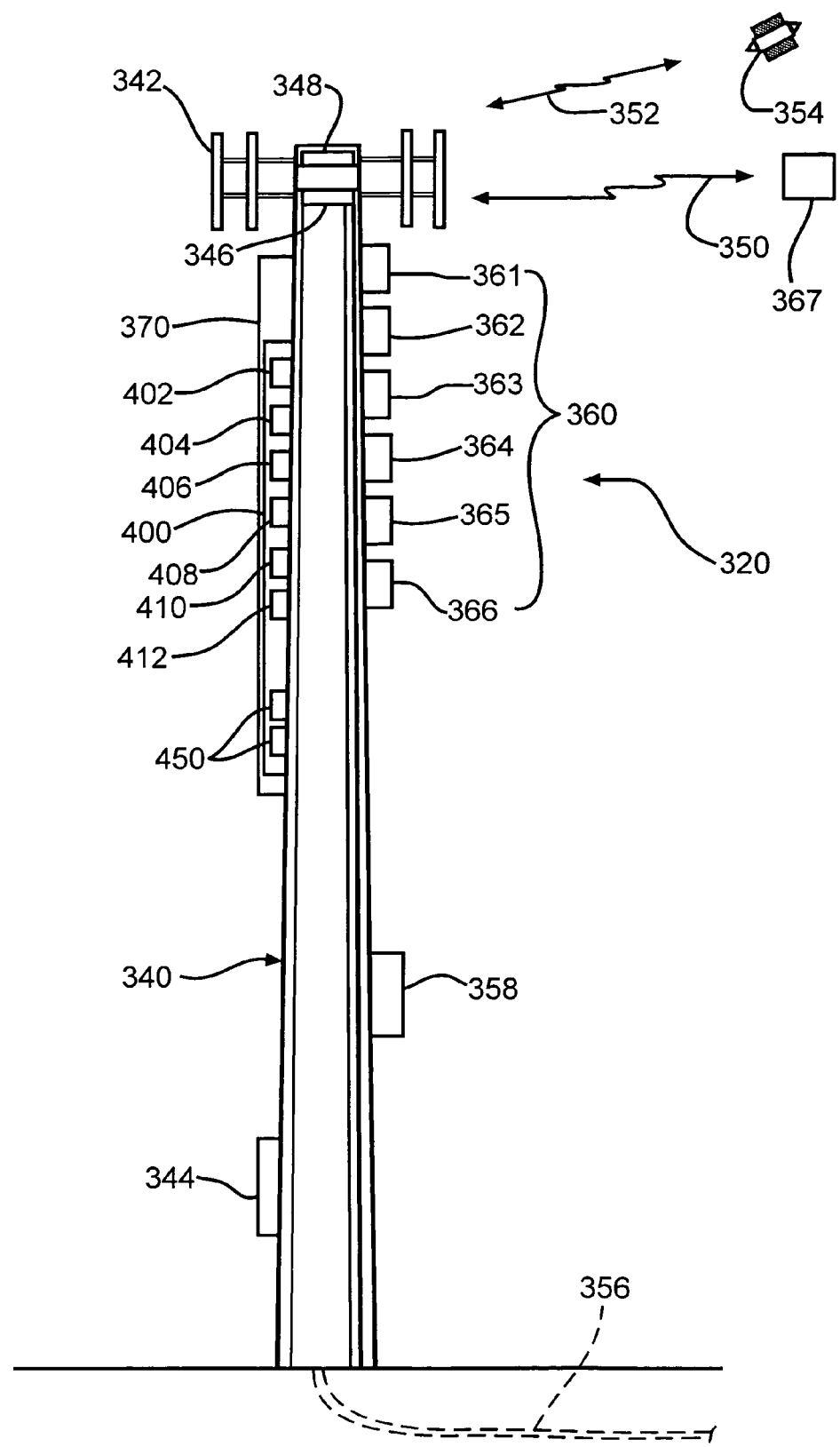
FIG. 8 is a schematic elevational view of a cell tower that supports a node of the invention.

Referring now to FIG. 7, there is illustrated a system for monitoring and/or detecting the occurrence of anomalies, indicated generally at 310, in accordance with another aspect of the invention. The system 310 is similar to the system 10 and generally only the components that differ will be described herein. Many of the components of the system 310 as illustrated in FIGS. 7 and 8 are similar in structure and function to corresponding components of the system 10 as illustrated in FIGS. 1 through 3. Therefore, such corresponding components are indicated by similar reference number in these Figures, but with the components of the system 310 as illustrated in FIGS. 7 and 8 having the addition of 300 to each reference number.

The system 310 may consist of a plurality of spaced apart nodes, indicated generally at 320, and more specifically at 321-330. Each node 320 may have adjacent nodes, with adjacent nodes 320 being connected by links 332. Each of the nodes 320 has one or more sensors associated with the node and capable of detecting anomalies. The links 332 may be wireless links, such as radio frequency (RF) signals transmitted and received between adjacent nodes 320, that tie the nodes 320 together to form the network 312. Hardwire links 334 are indicated among nodes 321-325 in FIG. 7.

In another embodiment of the invention, the network 312 of linked nodes 320 is connected to an emergency response system, indicated schematically at 336. A control and command center, indicated schematically at 337 is also connected to the network 312 to enable emergency authorities to control the efforts of various responders, and to handle such issues as media interface. Depending on the circumstances, there may be a need for secondary responders, indicated schematically at 338, including such responders as evacuation personnel, decontamination teams, and clean-up crews. Other types of secondary responders will be apparent to those skilled in the art. The emergency response system 336, the control and command center 337, and the secondary response system 338 can be linked to one another and to the network 312 by any suitable means, such as communication links 339.

In a preferred embodiment of the invention, the network 312 includes a data repository 335. The data repository 335 may be any data storage device and may be accessible for reading and/or writing data from some or all of the nodes 320. It will be appreciated that the data repository 335 may be directly or indirectly accessible by some or all of the nodes 320. For example, the data repository 335 may be accessible to some or all of the nodes 320 through another node or other entity outside the network 312 or system 310. Data may be shared throughout the network 312 by use of the data repository 335.

In a preferred embodiment of the invention, the system 310 may include a single node 320. In this embodiment, the single node 320 may be communicably connected to other nodes outside of the system 310, although such is not required. The single node 320 may include any combination of elements as described for the plurality of nodes 320 forming the network 312 as described herein.

The system 310 may be used to monitor, detect, and report environmental anomalies, such as, but not limited to, chemical, biological, radiological, nuclear, and explosive threats, and environmental monitoring, process control, traffic control on land, air and waterways, logistics, and inventory control.

An example of a preferred node 320 is shown in FIG. 8, where a cell tower 340 includes an antenna 342. The cell tower 340 is supplied with electric power by a means, not shown, and preferably includes an auxiliary power source 344 for use when the primary supply is cut off. The cell tower 340 may include a transmitter 346 and a receiver 348 for transmitting information to other nodes 320, if the tower 340 is communicably connected with other nodes 320 to form the network 312. The communication to adjacent nodes can be by any means, such as by radio waves 350 to an adjacent cell tower, not shown, or by radio waves 352 to a satellite 354 and then to a different node, or by a hardwire connection 356 to an adjacent tower, not shown. Optical communication modes can also be used. However, it will be appreciated that the tower 340 may be the only node 320 in the system 310. It will further be appreciated that although the preferred node 320 has been described as associated with a cell tower, the preferred node 320 may be associated with any suitable structure or location, such as, for example, any type of antenna, any portion of a building or rooftop, or an area such as a port or terminal.

The tower 340 includes at least one and preferably a plurality of sensors, indicated generally at 360. The sensors illustrated include a sensor 361 for sensing chemical hazards, a sensor 362 for sensing biological hazards, a sensor 363 for sensing nuclear hazards, a sensor 364 for sensing radiological hazards, and a sensor 365 for sensing explosive hazards. There are many different types of sensors that can be used for the sensors 360, as would be well known to those skilled in the art.

The tower 340 also includes a data repository 358. Each of the nodes 320 may include a data repository similar to the data repository 358. It will be appreciated that the data repository 358 of each node 320 may be accessible by not only the associated node 320, but all nodes 320 of the network 312, if multiple nodes 320 comprise the system 310.

Each of the nodes 320 in the system 310 may contain controllers 370. The controllers 370 may contain operating software as described for the controllers 70 above. However, the controllers 370 may also include at least one software agent 400 to perform at least a portion of the computational or information retrieval and/or distribution tasks of the controller 370, as will be further described herein. It will also be appreciated that the emergency response system 336, the control and command center 337, and the secondary response system 338 may also include respective controllers (not shown) that may have operating software and may have at least one software agent, similar to any or all of the software agents 400 described herein for the controller 370. For example, the emergency response system 336 may include or may obtain a software agent 400 when necessary to coordinate incoming communications and data when an emergency requiring a response has occurred. It will further be appreciated that the emergency response system 336, the control and command center 37, the secondary response system 338, and the data repository 335 may include any combination of the features described herein for each of the nodes 20, 320.

The software agents 400 may be any software that is programmed to mimic human behavior. For example, each of the software agents 400 may be programmed to determine an appropriate response given predetermined criteria, such as data from the sensors 360. Each of the software agents 400 may have a specific task or goal to accomplish for the controller 470 or the network 412. For example, a software agent may have a specific goal, such as a chemical detection agent that determines if chemical sensor data indicates a chemical release has occurred. Each of the software agents 400 may have multiple goals, and each software agent 400 may have criteria or belief sets programmed to determine and prioritize which goal or goals should be accomplished given the current criteria or conditions. For example, the chemical detection agent described above may check for a chemical release unless a nuclear release occurs. In the event of a nuclear release, the chemical detection agent could then cease chemical release detection. The software agents 400 of the system 310 facilitate decision making at the site of an anomaly detection. The goal or task of the software agents 400 may also be more general or administrative to the network. For example, a software agent 400 may be responsible for coordinating all of the other software agents 400 at one of the nodes 320.

The software agents 400 may be continuously running processes or may be loaded as needed in response to predetermined conditions. Further, some portion of the software agents 400 may be continuously running processes that determine when and/or where to load additional software agents. The software agents 400 may be deployed at each node 320 or may be deployed at any location on the network 312 as needed. In a preferred embodiment of the invention, the software agents 400 are mobile within the network 312 and may be programmed to determine their optimal location within the network 312 and may be able to relocate to their optimal location. For example, one of the software agents 400 may be programmed to accomplish a specific task, such as plume modeling of a chemical release. Once a chemical release has been detected at a node 320, the plume modeling software agent 400 may relocate to the node 320 where the chemical release was detected or to a node 320 near where a plume from the release is expected or predicted. In another embodiment of the invention, if the system 310 includes only one node, such as node 340, the software agents 400 at the node 340 may determine the optimal location within the node 340. For example, a software agent 400 may be programmed to control the frequency or operation of detection of one of the sensors 360. In response to the detection of an approaching tornado, the frequency detection software agent 400 may increase the detection frequency of the sensor 360 that measures wind speed. The software agents 400 may run until their goal is accomplished or until a sensed condition changes. However, the goal of the software agents may be continuous in nature.

Each of the software agents 400 may have a concept of operations (CONOPS). The concept of operations of each of the software agents 400 may provide a number of directions, criteria, belief sets and/or threshold values that assist each of the software agents 400 in determining an appropriate course of action based on a detected condition. Each of the software agents 400 may have multiple CONOPS and may have predetermined criteria to establish which is the appropriate CONOPS to implement. The CONOPS of each software agent 400 may also be remotely serviceable or upgradeable, from the command center 337, other nodes 320, and/or locations outside the network 312. The CONOPS of each of the software agents 400 may change based on sensor data, deductions from sensor data, and/or communications from other software agents 400. Each of the software agents 400 may change each others CONOPS. For example, if a chemical release is detected by a chemical release software agent, the chemical release software agent may temporarily assign a nuclear material detection software agent to inventory other chemicals in the area. Each of the software agents 400 may exercise control over the nodes 320 and the network 312. The software agents 400 may change the specialized function of another agent 400 or node 320. For example, if a software agent learns that a tornado is approaching a port, the software agent may determine that a port node normally used to monitor port security may be more useful monitoring weather and may change the CONOPS of the port node and/or the other software agents of the port node appropriately. The CONOPS of each of the software agents 400 may be event or task dependent. For example, if the goal of the software agent is to monitor chemical release, the software agent may check wind speed, or if the goal is predicting tornado conditions, the software agent may check barometric pressure. The changes to the CONOPS of the software agents 400 may vary based on the area of the system 310 affected by the detected event. For example, a detected chemical release may affect the entire system 310 and in response to this event, the CONOPS of all of the software agents 400 within the system 310 may be changed.

Within the network 312, the software agents 400 may include specialized software agents, such as security software agents and identity software agents. For example, security software agents could check conditions indicative of a breach or intrusion in the node 320 or network 312 or a failure in the network 312. Security software agents could additionally determine how to minimize the effects of a breach or failure on the network 312. Identity agents could provide the interface between nodes 320 and sensors 360 to achieve plug and play functionality, as described above in the prior embodiment and as will be described in more detail below.

The software agents 400 are programmed to interpret and/or determine a response to sensed conditions or data. The software agents 400 may gather or receive data from the sensors 360 and/or other devices within or outside of the network 312, such as other sensor networks, local area networks, and the Internet. The software agents 400 can analyze sensor data, compare sensed data to known event data, criteria, or threshold values, determine if an event is happening, report data to other agents 400 or nodes 320, and/or report characteristics of associated nodes 320 or sensors 360. The software agents 400 may share data and results with one another to create decision options for each software agent 400. The software agents 400 may also act independently or in cooperation with other software agents or software programs to prepare and communicate a derived product in addition to, or separate from, individual measurements. For example, sensor readings and combined sensor reading analysis results (such as plume modeling) and an associated photographic image (or geographic information system (GIS) background or one or more GIS layers) may be developed by one of the software agents 400 and communicated as a composite product to other software agents 400 or the data repositories 335, 358.

The software agents 400 may compile sensed data and any other available data to determine what type of anomaly scenario is occurring. For example, the software agents may compile various chemical detections, wind speed, and topographical data to determine a plume model for a chemical release. The software agents 400 may then determine an appropriate response to the anomaly scenario. For example, if the software agents 400 determine that a plume is headed toward a populated area, the emergency responders in that area may be notified with the plume model information. The software agents 400 may share the data they obtain and/or the calculations and results they derive with at least one human interface 367, although such is not required. It will be appreciated that the software agents 400 may respond to detected data and determine a response as described herein to such detections without alerting or involving any other parties, so that the software agents may operate and/or respond in a totally autonomous manner. The software agents 400 may be communicably connected to the at least one human interface 367 by any communications means, such as the radio waves 350, the radio waves 352 to a satellite 354 or by a hardwire connection 356, or any other radio waves, satellite, or hardwire connections within or extending beyond the node 320. It will be appreciated that the at least one human interface 367 may be located near or within the node 320 or the system 310. For example, the software agents 400 may communicate with handheld devices located within a range or area relative to the respective affected node 320.

If the software agents 400 determine as described above, that a chemical spill has occurred, the software agents 400 may then share appropriate data or results with various human interfaces 367. For example, the nearest chemical clean up responders may require the raw data regarding the chemicals detected in the area, but the nearest emergency responders may need the conclusions from the plume model, such as potential evacuation areas or symptoms of exposure to the detected chemical release. The human interface 367 may include any communication medium that allows the data from the software agents 400 to be interpreted by a user, examples of the human interface 367 may include but are not limited to a computer, a telephone, a facsimile machine, a handheld device, or any other electronic device that the software agents 400 may communicate with directly or indirectly. It will also be appreciated that the software agents 400 may directly interface with television, radio, the Internet, or any other media outlet, or emergency system, like a local 911 system or the Emergency Broadcast System. At least one of the human interfaces 367 may be located within any or each of the emergency response system 336, the control and command center 337, and the secondary response system 338.

The software agents 400 may use peer-to-peer communication and control topology. Each of the software agents 400 may communicate with one or several of the other software agents 400. The software agents 400 may communicate with one another by posting data and/or results to a shared blackboard, such as the data repositories 335, 358. Each of the software agents 400 may be capable of encapsulated and asynchronous communication by use of the data repositories 335, 358. The software agents 400 may communicate with one another by sending messages in a platform neutral and programming language neutral format such as Extensible Markup Language (XML). For example, software agents 400 implemented in Java would use the Java API for XML Processing (JAX) or Java Document Object Model (JDOM) library for generating and parsing messages.

The software agents 400 may be programmed to store data and/or results at their associated data repository 358, to other data repositories 358 at other or all nodes 320, and/or the data repository 335, and the locations to which software agents 400 may store data may vary in response to conditions or criteria acquired by the software agents 400. Software agents (not shown) outside of the network 312 may also post and retrieve data from the data repositories 335, 358. Software agents outside of the network 312 may post data such as impending power failures and communications failures that may affect the network 312, so that the software agents 400 within the network 312 can consider such conditions and modify their CONOPS if appropriate. The data repositories 335, 358 may also facilitate the remote upgrade of the CONOPS of the software agents 400 by allowing new CONOPS programming to be accessible at the data repositories 335, 358 to the software agents 400. The data repositories 335, 358 may also allow learning upgrades and/or collective CONOPS to be shared between the software agents 400.

The software agents 400 may be able to communicate with and/or control devices within or outside of the network 312, such as public warning systems and alarm systems. The software agents 400 may be able to post data and/or results to web sites, databases and local media. The software agents 400 may additionally be programmed to allow for remote administration and upgrade of the software agents 400 from the communicably connected devices outside of the network 312. The software agents 400 may be movable between nodes 320 or locations within the network 312. It will be appreciated that not all nodes 320 require software agents 400, and software agents at other nodes 320 may extract sensor readings or other data from nodes 320 without software agents 400. Each software agent 400 may include programming to determine the most effective node location for the software agent's goal, and allow the software agent to run at that location and take over or modify the function of that location to accomplish the goal of the software agent 400. Additionally, specialized software agents 400 may move in response to an event or condition posting. For example, a chemical clean up dispatching software agent 400 may move to a node that has detected a chemical spill. The mobility of the software agents 400 within the system 310 and the ease in dispersing the software agents 400 about the system 310 facilitate response determinations to be made at or near the level of anomaly detection. Additionally, the software agents 400 themselves may be coded in a highly portable language, such as Java, or a mobile agent framework built in Java such as the Java Agent Development Environment (JADE), Tryllian Agent Development Kit, or Aglets, so that the software agents 400 are portable across several system architectures. The software agents 400 may be coded in any language and may be portable across various software, hardware, and operating systems.

The software agents 400 may also learn and adapt the responses programmed for the software agent 400 to the environment of the software agent 400. Part of the CONOPS of a software agent 400 may be to add to or update the CONOPS for that software agent 400. Additionally, each software agent 400 may share its modifications with other software agents 400, so that learned updates to the CONOPS can be passed to all the appropriate software agents 400 of the network 312. It will be appreciated that at least one of the software agents 400 may be programmed to upgrade other software agents 400. A new software agent (not shown) may be deployed within the system 310 to initiate the upgrade of the software agents 400, or one or more of the software agents 400 may be programmed to upgrade some or all of the software agents 400 in response to a trigger or condition within the system 310 or a condition or trigger external to the system 310 that is detected by the system 310. Further, it will be appreciated that the upgrade of some or all of the software agents 400 may be initiated at a single node 320 or other location in the system 310 and such an upgrade may be initiated by one of the software agents 400 or an external agent or program (not shown) that communicates with the software agents 400. The upgrade of some or all of the software agents 400 may be facilitated by the software agents 400 themselves, such that each of the software agents 400 is programmed to determine if they are one of the software agents 400 that needs to be updated. The software agents 400 may additionally be programmed to upgrade one another, pass on upgrade information to other software agents 400 or data repositories 335, 358, or retrieve upgrade information from other software agents 400 or data repositories 335, 358.

The software agents 400 of the system 310 are preferably programmed to prioritize tasks that are important, and time critical information will have a higher priority on network transfers than routine information transmittal. This assures that the most important information is instantly incorporated into the common network-based operational picture. The software agents 400 may collaborate with one another to optimize the use of the resources and communications links within the network 312.

In one embodiment of the invention, each node 320 of the network 312 includes a plurality of identity software agents 450. Each of the identity software agents 450 includes various characteristics of the associated node 320. Each of the identity software agents 450 may reside in an associated node 320 and can contain programming and/or information specific to a particular sensor 360 equivalent to a technical electronic data sheet (TEDS). Each of the identity software agents 450 may alternatively be embedded in an interface between each respective sensor 360 and node 320. The identity software agents 450 may also be packaged with each sensor 360, although such is not required. If the identity software agents 450 are embedded, each may be programmable or permanently stored. Each of the identity software agents 450 allows for the easy identification of each of the sensors 360, because each of the sensors 360 appears as a software object on the network 312. The use of identity software agents 450 enhances methods for predictive maintenance and facilitates distributed command and control when necessary. By associating a software agent 450 with each sensor 360, this allows each sensor 360 to appear to be controlled as a software object by any device on the network. This also allows easy upgrading of existing sensors and instruments, and provides the ability to connect existing sensors to the system while allowing seamless integration of new sensors as they become available and certified for inclusion into the network. Various embodiments of the system 310 will now be described. In one embodiment of the invention, at least one software agent 400 is located at each of the nodes 320. A sensor 360 detects a chemical release at the cellular tower node 340. The software agents 400 at the cellular tower node 340 collaborate with the software agents 400 at each of the other nodes 320 to determine the appropriate CONOPS for each of the nodes 320 of the network 312. For example, nodes 320 not affected by the chemical release may modify their CONOPS to reduce storage to the data repository 335, so that the data repository 335 is available for use by affected nodes. The operations of the node 340 and other affected nodes 320 may include specific sensor/chemical detection, specific sensor/chemical testing, an increase in detection frequency, a decrease in detection frequency for other sensors, determination of wind speed and direction, informing adjacent nodes, estimating arrival times for adjacent nodes, communicating calculations to other nodes, confirming tests to check for false alarms, early launch of a plume model, early evacuation alarms, and priority streaming of data to the command center 337.

In one embodiment of the invention, during the scenario described herein for the detonation of a dirty bomb 372, a radiological sensor 364 at node 322 would sense the presence of the radiological fallout from the dirty bomb 372 at a level exceeding its predetermined threshold level. As an example of a preferred one of the at least one software agent 400, a sensor software agent 402 at the node 322 could be programmed to control the radiological sensor 364. For example, the sensor software agent 402 could control the frequency of detection, determine the threshold level(s), the criteria for or the frequency of reporting or posting detection data, and who or where to post detection data. One of the at least one software agents 400, such as a communications software agent 404, could be programmed to react to the detection of radiological material by sending notification to the adjacent nodes, i.e., the respective data repository 358 of the nodes 321, 324 and 325 over the available links 334 or 332 and/or the data repository 335. Software agents (not shown) at the nodes 321, 324, and 325 could in turn send notification to additional nodes and eventually the notification may reach the emergency response system 336 and the control and command center 337. Various ones of the at least one software agent 400 may be configured to automatically query respective ones of the associated sensors 360 at the node 320, and to automatically broadcast a signal upon the detection of a hazardous substance exceeding a predetermined allowable level or limit. The signal sent by the agents at the node where the anomaly was initially detected could be a signal that includes a command to each subsequent software agent to pass the signal on to the emergency response system 336 and the control and command center 337 or various other operating commands.

The communications software agent 404 may additionally or alternatively be programmed to control the frequency in which the sensors 360 of some or all of the node 320 detect or report their assigned detection function. The communications software agents 404 may change the operating parameters of other software agents 400 at affected nodes 320, nodes 320 in close proximity to the affected nodes 320, or at nodes 320 remote from the affected nodes 320 to optimize the operation of the network 312. For example, the communications software agents 404 may determine that a tornado is detected at node 321, referring again to FIG. 7. The communications software agents 404 may use various stored parameters to determine that, for example, the nodes 320 remote from node 321 should cease reporting non-emergency data to the command and control center 337 and/or the data repository 335 and/or the nodes 320 should not communicate non-emergency data to the node 321. The communications software agents 404 may be used to control and/or conserve communications and resources of the network 312.

In another embodiment of the invention, the at least one software agent 400 enables the controller 370 to predict or determine a future migration path of the plume of the hazardous component. The at least one software agent 400 includes a modeling software agent 406 that will take into account input from the relevant sensors 360 at the node 320 connected to the controller 370, including, to the extent pertinent, information from the meteorological sensor 366. For example, the modeling software agent 406 would take into account wind speed and direction information from the meteorological sensor 366 when modeling the future plume of an airborne radiation hazard. The modeling software agent 406 may consider various data such as population demographics and exposure effects on living organisms to determine appropriate response actions. Each controller 370 at each node 320 of the network 312 may include a modeling software agent 406, and, upon the detection of the hazardous substance, each modeling software agent 406 can form its own determination of the future migration path of the plume, and can provide its own warning signals. Preferably, the modeling software agents 406 in the various controllers 370 of the affected nodes 320 will be configured to reconcile differences associated with multiple computer-generated plume determinations. The software agents 406 of the affected nodes 320 may be able to coordinate data and calculations with one another to determine the appropriate course of action as a whole or to assist each of the software agents 406 in determining its own respective response to the plume event. Each software agent 406 could have different input values (e.g. detected concentration of the hazardous material, wind speed, wind direction, precipitation) related to the associated node 320 of the software agent 406. For example, with reference to FIG. 7, if both node 321 and node 322 detect a hazardous substance, and if the modeling software agents 406 of both nodes 321 and 322 develop a plume model, then the aggregate plume model or combination of the two plume models may provide a more accurate picture of the expected movement of the hazardous plume over time.

The at least one software agent 400 may include a source software agent 408 that is programmed to determine the point of origin or initial source of hazardous material. The source software agent 408 may exist at any number of locations on the network 312, including a single location or at each node 320 of the network 312 or any location of the system 310. If the source software agent 408 does not exist at each node 320 of the network 312, the source software agent 408 may be programmed to mobilize in response to a detected or reported hazardous event occurring on the network. It may be desirable that the source software agent 408 relocate to a node in proximity to a detected hazard to acquire or control data and nodes 320 close to the hazard, or it may be desirable that the source software agent 408 be located at a predetermined distance within the network 312 from the hazard, such that the source software agent 408 operates at a distance from the affected nodes 320. If more than one source software agent 408 exists on the network 312, the source software agents 408 may work in conjunction with one another to determine the point of origin of the hazardous material. The source software agents 408 may change the operating parameters of at least some of the controllers 370 and other software agents 400 on the network 312 in response to the detection of a hazard or the determination of the location of a hazard.

In a preferred embodiment of the invention, the at least one software agent 400 of the controller 370 includes a readiness software agent 410. The readiness software agent 410 may be programmed to determine when, how, and which nodes 320 should be checked for system readiness, i.e. that a node 320 has all components in working order as described herein for the controller 370. Each of the controllers 370 may use the communication software agents 404 and/or the readiness software agents 410, as described above, to share detected data between the nodes 320 and to determine the best form of communicating detected data across the network 312. The controller 370 may include software agents 400, such as the communication software agent 404 and/or the readiness software agent 410, that are capable of determining the operability of the communications links of the network 312 as described herein. The communications software agent 404 may prioritize communications for optimal communication across the system 310 and the communications software agent 404 may be able to direct, route, or reroute communications as necessary within the system 310. Additionally, communication software agents 404 may determine and/or implement alternative communications methods if it is determined that established communications links have failed or are vulnerable to failure or interception. For example, if a communications software agent 404 cannot communicate using one form of communications, it can choose another form of or route for the desired communications. As a further example, a communications software agent 404 or other software agent 400 may determine that there is sensitive information to report, and the communications software agent 404 or other agent 400 may then additionally determine and use a secure means of communication, and may also determine to what locations and individuals are authorized to receive the sensitive information. Further, the communications software agent 404 may be able to determine and execute an optimum mode of communications based on current detected conditions and established criteria. For example, the communications software agent 404 may determine that data from a node 320 that has a currently detected anomaly should be posted to a data repository as soon as possible, so the communication software agent 404 may increase the bandwidth allotted to the affected node 320 for communication postings.

In a preferred embodiment of the invention, the controller 370 may include a testing software agent 412 that controls the sensors 360, and, in response to the detections of the sensors 360, can modify the detection frequency or level of testing performed by the sensors 360. The testing software agent 412 may include predetermined threshold values for the sensors 360 that are used to determine the appropriate course of action after a sensor 360 reading.

In another embodiment of the invention, the communications software agent 404 of the controllers 370 is programmed to store data from the respective node 320 or other nodes 320 within the respective memory 371, the respective data repository 358, and/or the network data repository 335. It will be appreciated that the memory 371 of each node 320 may encompass the data repository 358 of each node 320, although such is not required. It will be appreciated that the data repository 358 of each node 320 is accessible by not only the associated node 320, but also all nodes 320 of the network 312. Thus, for example, the communications software agent 404 may communicate with other nodes 320 by storing information at the respective data repository 358 of the other nodes 320 or by storing data to the respective memory 371, the respective data repository 358, any data repository 358 of the network, and/or the network data repository 335 where the information can be retrieved or read by the other nodes 320.

In another embodiment of the invention, each of the software agents 400 can be occasionally supplied with signals to change the operation of the node, upgrade the software in the controller, or to add a new function or new commands. For example, if a new type of radiological sensor 364 is added to each of the nodes 320 in the network 312, the software agent 400 for controlling the new sensors 364 and for interpreting the signals from the new sensors can be downloaded or otherwise supplied to the controllers 370 of each of the nodes. Other examples of input to the software agents 400 include providing commands to modify the threshold limits of various sensors, providing commands to calibrate the sensors 360 and other equipment, and conducting preventative repair and maintenance. Commands to the software agents 400 can come from any appropriate source, such as the command center 337, and can be sent via any suitable link, such as a radio wave link 332, a hard wire link 334 or a satellite link. Alternatively, the upgrade or new instructions can be downloaded manually at the node. Further, the software agent 400 can be programmed to change its operation upon the occurrence of any one or more event in the group of predetermined events, such as, for example, consisting of the detection of an anomaly, the destruction of a communication link to an adjacent node, a loss of power from a primary source of power, a loss of controller capability, a decrease in capability of a processor, a decrease in the capability of memory storage, a degradation of a communication link, a change in the security risk of a communication link, and a command from another node. Any prior example of a change in operation of a node described herein can be accomplished by reprogramming the appropriate software agents 400. In one embodiment of the invention, at least one software agent 400 is located within the system 310. The system 310 includes only a single node, the cellular tower node 340. The system is configured so that if one of the sensors 360 detects a chemical release at the cellular tower node 340, the software agent 400 may determine the optimal location of the software agent 400 within the single node 340 and move to the optimal location for the detection that has occurred. The software agent 400 at the cellular tower node 340 can determine the appropriate CONOPS for each of the sensors 360. The software agent 400 controls the frequency of detection for each of the sensors 360, interprets the data collected from the sensors 360, determines a plume model for the chemical release, and distributes the results of the plume model to emergency responders, such as the command center 337. The results of the plume model may include, for example, evacuation areas and deadlines for evacuation, medical conditions or symptoms related to exposure to the chemical that has been released, recommended antidotes for detected hazardous materials, and likely sources for such antidotes, and estimated length of time for safe dispersion of the chemical.

It will be appreciated that any combination or subset of the embodiments described herein may be practiced in accordance with the present invention.

The principle and mode of operation of this invention have been described in its preferred embodiments. However, it should be noted that this invention may be practiced otherwise than as specifically illustrated and described without departing from its scope.

What is claimed is:

1. A system for detecting the occurrence of anomalies comprising:

a plurality of spaced apart nodes, with each node having adjacent nodes;

at least one sensor associated with each of the nodes, the sensor capable of detecting at least one predetermined anomaly;

at least one individual controller connected to the at least one sensor associated with each node;

a plurality of communication links connecting adjacent nodes to form a network with each node operable to communicate with more than one other node; and a software agent associated with each of the controllers, the software agent programmed with respect to a concept of operations corresponding to the software agent, the software agent operable, in accordance with the concept of operations, to cause the controller to send a message to at least one other node over the communication links upon detection of the predetermined anomaly by the sensor connected to the associated controller, the message causing changes in a concept of operations corresponding to at least one software agent at the one other node.

2. The system of claim 1, wherein at least one of the software agents is programmed to send a command to run a specific test.

3. The system of claim 1, wherein at least one of the software agents is programmed to send a command to modify a threshold level for a test.

4. The system of claim 1, wherein at least one of the software agents is programmed to send a command to transmit additional data.

5. The system of claim 1, wherein at least one of the software agents is programmed to send a command to change the frequency of a routine specific test.

6. The system of claim 1, wherein at least one of the software agents is programmed to send a command to send a status of calibration of a sensor.

7. The system of claim 1, wherein at least one of the software agents is programmed to send a command to query identification data of a sensor.

8. The system of claim 1, wherein at least one of the software agents is programmed to send a command to change the functionality of an entire node.

9. The system of claim 1, wherein at least one of the software agents is programmed to send a command to change the transmittal rate of data.

10. The system of claim 1, wherein at least one of the software agents is programmed to send a command to perform predictive analysis.

11. The system of claim 1, wherein at least one of the software agents is programmed to send a command to become a data storage facility.

12. The system of claim 1, wherein at least one of the software agents is programmed to send a command to query another node.

13. A system for monitoring environmental conditions for anomalies comprising:
- a plurality of spaced apart nodes, with each node having adjacent nodes;
- at least one sensor associated with each of the nodes, the sensor capable of detecting at least one environmental anomaly;
- at least one controller connected to the at least one sensor associated with each node;
- a plurality of communication links between adjacent nodes, to form a network; and
- a software agent associated with each of the controllers with each software agent programmed with respect to a concept of operations corresponding to the software agent, the software agent operable, in accordance with the concept of operations, to cause the controller to change the operation of at least one of the controllers and the sensors of another node of the network when there is an indication that an environmental anomaly has been detected.

14. The system of claim 13, wherein the at least one sensor is operative to detect an operational anomaly that includes at least one of the detection of the destruction of a communication link to an adjacent node, a loss of power from a primary source of power, a loss of controller capability, a decrease in capability of a processor, a decrease in the memory storage, and a command from another node.

15. The system of claim 14, wherein each software agent is programmed to operate the controller in an event state when there is an indication that at least one of an environmental anomaly an operational anomaly has been detected and a quiescent state when there is no indication that an anomaly has been detected.

16. The system of claim 13, wherein each software agent is embedded within the controller of the respective node.

17. The system of claim 13, wherein the software agent includes a plurality of concepts of operation and further wherein the software agent implements an appropriate concept of operations when an anomaly has been detected and posts data representative of the anomaly to adjacent nodes.

18. The system of claim 13, wherein the software agent at each node is reprogrammable.

19. The system of claim 13, wherein each software agent contains at least one concept of operations for the respective node.

20. The system of claim 13, wherein the system further includes at least one network data repository and further wherein each software agent is adapted to post data to the at least one network data repository.

21. The system of claim 20, wherein each software agent is adapted to interpret event data posted by a software agent at another node and react accordingly.

22. The system of claim 21, wherein each software agent may post data to a data repository at another node of the network in response to the interpreted event data.

23. The system of claim 20, wherein external agents that are outside of the network and communicably connected to the network may post data to the at least one network data repository.

24. The system of claim 13, wherein each software agent may be modified from a location that is outside of the network and communicably connected to the network.

25. The system of claim 13, wherein the software agents are adapted to monitor the network for disruptions.

26. The system of claim 13, wherein the software agents are adapted to contain network disruptions.

27. The system of claim 13, wherein each node includes an identity agent associated with the node and further wherein each identity agent contains data relating to the associated node.

28. The system of claim 27, wherein each identity agent is programmed to communicate with an attached sensor.

29. The system of claim 28, wherein each identity agent includes a technical electronic data sheet for the attached sensor.

30. The system of claim 27, wherein each identity agent is embedded in an interface between the sensor and the node.

31. The system of claim 27, wherein each identity agent is either programmable or permanently stored.

32. A system for responding to environmental anomalies comprising:
- a plurality of spaced apart nodes, with each node having adjacent nodes;
- at least one sensor associated with each of the nodes, the sensor capable of detecting at least one environmental condition;
- at least one individual controller connected to the at least one sensor associated with each node;
- a plurality of communication links connecting adjacent nodes to form a network with each node operable to communicate with more than one other node;
- a control and command center in communication with the network nodes, the control and command center operable to enable emergency authorities to control the efforts of various responders; and
- a software agent associated with each of the controllers, the software agent programmed with respect to the associated controller, the software agent operative to determine an anomaly scenario in response to detection of at least one environmental condition sensed by at least one of the sensors, the software agent further operable to transmit data related to the anomaly scenario to more than one of the plurality of nodes and the human interface with the anomaly scenario data causing changes in the operation of at least one software agent at one other node.

33. The system of claim 32, wherein each node includes at least one software agent.

34. The system of claim 32, wherein each controller includes at least one software agent.

35. The system of claim 32, wherein each controller includes a software agent for each associated sensor.

36. The system of claim 32, wherein the at least one software agent is adapted to move between nodes on the network.

37. The system of claim 32, wherein the software agents are adapted to communicate with other software agents.

38. The system of claim 32, wherein the system further includes at least one network data repository and further wherein the software agents are adapted to post data to the at least one network data repository.

39. The system of claim 32, wherein the software agents are adapted to collaborate with one another in response to the detection of an environmental anomaly by at least one of the sensors to optimize the use of resources and the communication links within the network.

40. The system of claim 32, wherein the software agents include programming containing at least one predetermined concept of operations for at least one of the controllers.

41. A method of monitoring environmental conditions for anomalies comprising the steps of:

(a) distributing a plurality of spaced apart nodes, with each node having adjacent nodes, each of the nodes having at least one sensor associated with the node and capable of detecting environmental anomalies, each of the nodes having a controller connected to the sensors associated with the node, and each of the controllers having a software agent that is programmed with respect to the controller and in accordance with a concept of operations corresponding to the software agent;

(b) communicably connecting adjacent nodes to form a network; and (c) programming the software agent at a first node to change a concept of operations corresponding to at least one software agent at a second node of the network that is different from the first node upon detection of an environmental anomaly at the first node.

* * * * *